US011705779B2

(12) United States Patent
Byaliy et al.

(10) Patent No.: US 11,705,779 B2
(45) Date of Patent: Jul. 18, 2023

(54) INVERTER GENERATOR

(71) Applicant: Briggs & Stratton, LLC, Wauwatosa, WI (US)

(72) Inventors: Svetlana Byaliy, Mequon, WI (US); Joshua Thurnbauer Cirillo, Sussex, WI (US); Philip Helwig, Milwaukee, WI (US); Sie Teong Lim, Brookfield, WI (US); Mark Thomas Molinski, New Berlin, WI (US); Kenny Jalmas Stair, Norht Prairie, WI (US); Robert Townsend, Delafield, WI (US); Jeffrey H. Whitmore, Wauwatosa, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 0 days.

(21) Appl. No.: 17/719,046

(22) Filed: Apr. 12, 2022

(65) Prior Publication Data

US 2022/0239193 A1 Jul. 28, 2022

Related U.S. Application Data

(63) Continuation-in-part of application No. 17/336,711, filed on Jun. 2, 2021, now Pat. No. 11,591,977.
(Continued)

(51) Int. Cl.
*H02K 7/18* (2006.01)
*F02B 69/04* (2006.01)
(Continued)

(52) U.S. Cl.
CPC ......... *H02K 7/1815* (2013.01); *F02B 63/042* (2013.01); *F02B 63/044* (2013.01);
(Continued)

(58) Field of Classification Search
CPC ...... H02K 7/1815; H02K 9/06; F02B 63/042; F02B 63/044; F02B 69/04; H02P 9/009; H02P 9/04; H02P 6/08
(Continued)

(56) References Cited

U.S. PATENT DOCUMENTS 2,543,541 A   2/1951   Angle
D194,490 S   1/1963   Winslow et al.
(Continued)

FOREIGN PATENT DOCUMENTS

CN   202039946       11/2011
CN   202325832 U    7/2012
(Continued)

OTHER PUBLICATIONS

Cummins-Onan RS 12000 12 KW generator specification, available by Oct. 28, 2009, 5 pages.
(Continued)

*Primary Examiner* — Mahmoud Gimie
(74) *Attorney, Agent, or Firm* — Foley & Lardner LLP

(57) ABSTRACT

A standby generator includes a standby housing defining a cavity and an internal combustion engine. The engine includes an engine block including a cylinder comprising a piston, an engine housing at least partially covering the engine block, and a crankshaft configured to rotate about a vertical crankshaft axis in response to movement by the piston. The standby generator also includes an alternator configured to generate alternating current electrical power, a controller comprising a rectifier configured to convert the alternating current to a direct current and an inverter configured to convert the direct current to a clean alternating current electrical power, and a transfer switch configured to receive the clean alternating current electrical power from the controller and at least one of grid, solar, or battery power,
(Continued)

and configured to supply power to an electrical load. The internal combustion engine, the alternator, and the controller are positioned within the cavity.

16 Claims, 24 Drawing Sheets

Related U.S. Application Data

(60) Provisional application No. 63/034,069, filed on Jun. 3, 2020.

(51) Int. Cl.

| | |
|---|---|
| F02P 5/15 | (2006.01) |
| H02K 13/12 | (2006.01) |
| F02B 63/04 | (2006.01) |
| H02K 9/06 | (2006.01) |
| H02K 5/22 | (2006.01) |
| H02P 6/08 | (2016.01) |
| H02P 9/00 | (2006.01) |
| H02P 9/04 | (2006.01) |
| H02P 1/12 | (2006.01) |
| H02P 27/06 | (2006.01) |
| H02P 101/25 | (2016.01) |

(52) U.S. Cl.
CPC ............ *F02B 69/04* (2013.01); *F02P 5/1506* (2013.01); *H02K 5/22* (2013.01); *H02K 9/06* (2013.01); *H02K 13/12* (2013.01); *H02P 1/12* (2013.01); *H02P 6/08* (2013.01); *H02P 9/009* (2013.01); *H02P 9/04* (2013.01); *H02P 27/06* (2013.01); *F02B 2063/045* (2013.01); *F02B 2201/064* (2013.01); *H02P 2101/25* (2015.01)

(58) Field of Classification Search
USPC ....................................................... 123/52.1
See application file for complete search history.

(56) References Cited

U.S. PATENT DOCUMENTS

| | | |
|---|---|---|
| 3,096,900 A | 7/1963 | Breneman |
| 3,586,915 A | 6/1971 | Urquhart et al. |
| 3,616,867 A | 11/1971 | Celli |
| 3,666,978 A | 5/1972 | Renner |
| 3,714,449 A | 1/1973 | De Bella |
| 3,756,137 A | 9/1973 | Scharres |
| 3,791,682 A | 2/1974 | Mitchell |
| 3,951,114 A | 4/1976 | Fachbach et al. |
| 3,965,948 A | 6/1976 | Lundin |
| 3,990,464 A | 11/1976 | Jenkins |
| 4,007,388 A | 2/1977 | Lawyer et al. |
| 4,054,115 A | 10/1977 | V. Habsburg-Lothringen |
| 4,071,009 A | 1/1978 | Kraina |
| 4,089,464 A | 5/1978 | Teti et al. |
| 4,122,353 A | 10/1978 | Noguchi |
| 4,192,431 A | 3/1980 | Brown |
| 4,194,521 A | 3/1980 | Banta |
| 4,262,209 A | 4/1981 | Berner |
| 4,324,208 A | 4/1982 | Danckert et al. |
| 4,325,451 A | 4/1982 | Umeda |
| 4,406,387 A | 9/1983 | Rasor |
| 4,409,502 A | 10/1983 | McCabria |
| 4,493,390 A | 1/1985 | Pagano et al. |
| 4,499,733 A | 2/1985 | Farr et al. |
| 4,579,047 A | 4/1986 | Zielinski |
| 4,581,987 A | 4/1986 | Ulicny |
| 4,629,031 A | 12/1986 | Kato et al. |
| 4,676,025 A | 6/1987 | Mattscheck et al. |
| 4,698,975 A | 10/1987 | Tsukamoto et al. |
| 4,702,201 A | 10/1987 | Odo et al. |
| 4,733,750 A | 3/1988 | Poirier et al. |
| 4,835,405 A | 5/1989 | Clancey et al. |
| 4,836,369 A | 6/1989 | Pickering |
| 4,871,922 A | 10/1989 | Heinrich et al. |
| 4,928,583 A | 5/1990 | Taylor et al. |
| 4,958,687 A | 9/1990 | Nakagawa |
| 5,003,948 A | 4/1991 | Churchill et al. |
| 5,014,660 A | 5/1991 | Westerbeke, Jr. |
| 5,074,254 A | 12/1991 | Takamatsu |
| 5,125,236 A | 6/1992 | Clancey et al. |
| 5,125,378 A | 6/1992 | Westerbeke, Jr. |
| 5,177,390 A | 1/1993 | Van Maaren |
| 5,181,541 A | 1/1993 | Bodenheimer |
| 5,183,175 A | 2/1993 | Brown |
| 5,245,960 A | 9/1993 | Macier et al. |
| 5,274,200 A | 12/1993 | Das et al. |
| 5,305,673 A | 4/1994 | Costley |
| 5,351,476 A | 10/1994 | Laborie et al. |
| 5,355,927 A | 10/1994 | McKeon |
| 5,406,050 A | 4/1995 | Macomber et al. |
| 5,425,673 A | 6/1995 | Mahlanen et al. |
| 5,433,175 A | 7/1995 | Hughes et al. |
| 5,467,747 A | 11/1995 | Brandt et al. |
| 5,515,816 A | 5/1996 | Ball et al. |
| 5,575,349 A | 11/1996 | Ikeda et al. |
| 5,625,172 A | 4/1997 | Blichmann et al. |
| 5,626,105 A | 5/1997 | Locke et al. |
| 5,642,702 A | 7/1997 | Kouchi et al. |
| 5,693,108 A | 12/1997 | Roome |
| 5,694,889 A | 12/1997 | Ball et al. |
| 5,731,687 A | 3/1998 | Hirano et al. |
| 5,734,148 A | 3/1998 | Latvis et al. |
| 5,810,405 A | 9/1998 | Kettlewood |
| 5,816,102 A | 10/1998 | Kern et al. |
| 5,850,061 A | 12/1998 | Klompenhouwer et al. |
| 5,890,460 A | 4/1999 | Ball et al. |
| 5,899,174 A | 5/1999 | Anderson et al. |
| 5,914,467 A | 6/1999 | Jonas et al. |
| 5,929,394 A | 7/1999 | Westerbeke, Jr. |
| 5,929,611 A | 7/1999 | Scott et al. |
| 5,959,841 A | 9/1999 | Allen et al. |
| D416,537 S | 11/1999 | Imai et al. |
| 5,977,667 A | 11/1999 | Hirose |
| 6,016,634 A | 1/2000 | Sayer |
| 6,022,271 A | 2/2000 | Biondo |
| 6,084,313 A | 7/2000 | Frank |
| 6,095,099 A | 8/2000 | Morohoshi et al. |
| 6,116,374 A | 9/2000 | Westerbeke, Jr. |
| 6,155,921 A | 12/2000 | Evans et al. |
| 6,181,019 B1 | 1/2001 | Frank |
| 6,181,028 B1 | 1/2001 | Kern et al. |
| 6,189,649 B1 | 2/2001 | Nitschke |
| 6,310,404 B1 | 10/2001 | Frank |
| 6,313,543 B1 | 11/2001 | Frank |
| 6,331,740 B1 | 12/2001 | Morohoshi et al. |
| 6,342,004 B1 | 1/2002 | Lattimore et al. |
| 6,351,692 B1 | 2/2002 | Eaton et al. |
| 6,362,533 B1 | 3/2002 | Morohoshi et al. |
| 6,376,944 B1 | 4/2002 | Grizzle et al. |
| 6,388,869 B1 | 5/2002 | Fauteux et al. |
| H2045 H | 9/2002 | Busse et al. |
| 6,443,130 B1 | 9/2002 | Turner et al. |
| 6,447,264 B1 | 9/2002 | Lucas et al. |
| 6,464,028 B1 | 10/2002 | Imani |
| 6,489,690 B1 | 12/2002 | Hatsugai et al. |
| 6,597,571 B2 | 7/2003 | Kubota et al. |
| 6,630,756 B2 | 10/2003 | Kern et al. |
| 6,644,923 B1 | 11/2003 | Fine et al. |
| 6,657,123 B2 | 12/2003 | Moore |
| 6,657,416 B2 | 12/2003 | Kern et al. |
| 6,657,861 B2 | 12/2003 | Irmer |
| 6,660,967 B2 | 12/2003 | Brofft et al. |
| 6,685,447 B2 | 2/2004 | Mabe et al. |
| 6,686,547 B2 | 2/2004 | Kern et al. |
| 6,700,356 B1 | 3/2004 | Dorn |
| 6,701,221 B1 | 3/2004 | Eaton et al. |
| 6,731,098 B1 | 5/2004 | Hintz et al. |
| 6,756,693 B2 | 6/2004 | Kennedy |
| 6,784,574 B2 | 8/2004 | Turner et al. |
| 6,813,143 B2 | 11/2004 | Makela |

(56) References Cited

U.S. PATENT DOCUMENTS

| | | |
|---|---|---|
| 6,952,056 B2 | 10/2005 | Brandenburg et al. |
| 6,962,057 B2 | 11/2005 | Kurokawa et al. |
| 6,980,911 B2 | 12/2005 | Eaton et al. |
| 6,998,725 B2 | 2/2006 | Brandenburg et al. |
| D516,507 S | 3/2006 | Nushart et al. |
| 7,033,268 B2 | 4/2006 | Caliendo et al. |
| 7,157,811 B2 | 1/2007 | Eaton et al. |
| 7,193,333 B1 | 3/2007 | Kitch |
| 7,230,345 B2 | 6/2007 | Winnie et al. |
| 7,238,916 B2 | 7/2007 | Samodell et al. |
| 7,245,033 B2 | 7/2007 | Wurtele |
| 7,259,481 B2 | 8/2007 | Eaton et al. |
| 7,314,397 B2 | 1/2008 | Sodemann et al. |
| 7,325,519 B2 | 2/2008 | Sugimoto et al. |
| D564,450 S | 3/2008 | Gravlin et al. |
| 7,402,766 B1 | 7/2008 | Jonas et al. |
| 7,411,153 B2 | 8/2008 | Radtke |
| 7,444,982 B2 | 11/2008 | Rivet |
| 7,445,238 B2 | 11/2008 | Marriott |
| 7,461,617 B2 | 12/2008 | Onodera et al. |
| 7,482,705 B2 | 1/2009 | Piercey, III |
| 7,513,223 B2 | 4/2009 | Onodera et al. |
| 7,582,978 B2 | 9/2009 | Flanigan et al. |
| 7,597,340 B2 | 10/2009 | Hirose et al. |
| 7,642,665 B2 | 1/2010 | Konop et al. |
| 7,674,147 B2 | 3/2010 | Zwieg et al. |
| 7,739,997 B2 | 6/2010 | Leisner |
| 7,825,641 B2 | 11/2010 | Eaton et al. |
| 7,902,705 B2 | 3/2011 | Gravlin et al. |
| 8,342,330 B2 | 1/2013 | Weston et al. |
| 9,755,480 B2 | 9/2017 | Janscha et al. |
| 2002/0126853 A1 | 9/2002 | Stuart |
| 2003/0211262 A1 | 11/2003 | Ruid et al. |
| 2005/0029815 A1 | 2/2005 | Brandenburg et al. |
| 2005/0046191 A1 | 3/2005 | Cole et al. |
| 2006/0054113 A1 | 3/2006 | Yasuda et al. |
| 2006/0065216 A1 | 3/2006 | Sugimoto et al. |
| 2006/0080971 A1 | 4/2006 | Smith et al. |
| 2007/0060037 A1 | 3/2007 | Kim et al. |
| 2007/0108767 A1 | 5/2007 | Hirose et al. |
| 2007/0137591 A1 | 6/2007 | Sugimoto et al. |
| 2007/0227470 A1 | 10/2007 | Cole et al. |
| 2008/0042625 A1 | 2/2008 | Konop et al. |
| 2008/0053746 A1 | 3/2008 | Albert et al. |
| 2008/0185801 A1 | 8/2008 | Gravlin et al. |
| 2008/0202447 A1 | 8/2008 | Kochi et al. |
| 2008/0238221 A1 | 10/2008 | Yamamoto et al. |
| 2008/0248739 A1 | 10/2008 | Carlson et al. |
| 2009/0045635 A1 | 2/2009 | Flynn |
| 2009/0050591 A1 | 2/2009 | Hart et al. |
| 2009/0058098 A1 | 3/2009 | Flynn |
| 2009/0066091 A1 | 3/2009 | Hunter |
| 2009/0302788 A1 | 12/2009 | Mitsuda et al. |
| 2010/0037837 A1 | 2/2010 | Yamasaki et al. |
| 2010/0083616 A1 | 4/2010 | Place et al. |
| 2010/0147838 A1 | 6/2010 | Whittam et al. |
| 2010/0161270 A1 | 6/2010 | Jayasheela |
| 2011/0115235 A1 | 5/2011 | Steffl |
| 2011/0148228 A1 | 6/2011 | Gravlin et al. |
| 2012/0124955 A1 | 5/2012 | Klika et al. |
| 2014/0151148 A1 | 6/2014 | Pradhan |
| 2015/0059662 A1 | 3/2015 | Lan et al. |
| 2015/0180367 A1* | 6/2015 | Tesch ................ H02M 7/493 363/95 |
| 2015/0180393 A1* | 6/2015 | Tesch ................ H02P 9/007 322/29 |
| 2016/0161318 A1 | 6/2016 | Pruzina |
| 2016/0233739 A1 | 8/2016 | Jenison et al. |
| 2017/0314451 A1 | 11/2017 | Jochman |
| 2019/0055884 A1 | 2/2019 | Derra et al. |

FOREIGN PATENT DOCUMENTS

| | | |
|---|---|---|
| CN | 204458021 U | 7/2015 |
| DE | 33 34 429 | 4/1985 |
| EP | 0 801 837 B1 | 2/2002 |
| EP | 1 302 638 | 4/2003 |
| EP | 1 645 737 | 4/2006 |
| EP | 1 887 197 | 2/2008 |
| EP | 2 192 664 A1 | 6/2010 |
| GB | 2 200 742 A | 8/1988 |
| KR | 893713 B1 | 4/2009 |
| WO | WO-02/070874 A3 | 9/2002 |
| WO | WO-2006/035636 A1 | 4/2006 |
| WO | WO-2008/027370 A2 | 6/2010 |
| WO | WO-2010/060481 A1 | 6/2010 |
| WO | WO-2010/060482 A1 | 6/2010 |
| WO | WO-2017/151956 | 9/2017 |
| WO | WO-2011/088450 A2 | 7/2021 |
| WO | WO-2011/088460 A2 | 7/2021 |

OTHER PUBLICATIONS

Generac Home Standby Generator Sets, 7, 10 and 13KW specifications, available by Oct. 28, 2009, 4 pages.

Kohler Co. Power Systems, "Kohler Vertical Shaft Engine Standby Generator Hinged Roof," Dimension Print ADV-8774, Apr. 16, 2013, 3 pages.

Kohler Residential Generators 17RES specifications, available by Oct. 23, 2009, 2 pages.

Webpage showing Cummins-Onan RS 12000 12 KW Generator Specifications, available by Oct. 23, 2009, 3 pages.

* cited by examiner

INVERTER GENERATOR

CROSS-REFERENCE TO RELATED APPLICATION

This application is a continuation-in-part of U.S. patent application Ser. No. 17/336,711, filed Jun. 2, 2021, which claims the benefit of and priority to U.S. Provisional Patent Application No. 63/034,069, filed Jun. 3, 2020, both of which are hereby incorporated by reference in their entireties.

BACKGROUND

The present invention relates generally to the field of standby generators, and more particularly to the field of inverter generators.

SUMMARY

One exemplary embodiment relates to a standby generator including a standby housing defining a cavity and an internal combustion engine. The internal combustion engine includes an engine block including a cylinder comprising a piston, an engine housing at least partially covering the engine block, and a crankshaft configured to rotate about a vertical crankshaft axis in response to movement by the piston. The standby generator also includes an alternator comprising a rotor and a stator, the rotor configured to rotate with the rotation of the crankshaft to generate alternating current electrical power, a controller comprising a rectifier configured to convert the alternating current to a direct current and an inverter configured to convert the direct current to a clean alternating current electrical power, and a transfer switch configured to receive the clean alternating current electrical power from the controller and at least one of grid power from an electrical grid, solar power from a solar panel assembly, or battery power from a battery, and configured to supply power to an electrical load. The internal combustion engine, the alternator, and the controller are positioned within the cavity of the standby housing for protection from the external environment.

Another exemplary embodiment relates to a standby generator including a standby housing defining a cavity and an internal combustion engine. The internal combustion engine includes an engine block including a cylinder comprising a piston, an engine housing at least partially covering the engine block, a crankshaft configured to rotate about a vertical crankshaft axis in response to movement by the piston, and a spark plug configured to periodically generate a spark to ignite fuel in the cylinder to control the movement of the piston. The standby generator also includes an alternator positioned within an alternator housing and comprising a rotor and a stator, the rotor configured to rotate with the rotation of the crankshaft to generate alternating current electrical power, a controller positioned within the alternator housing and including a rectifier configured to convert the alternating current to a direct current and an inverter configured to convert the direct current to a clean alternating current electrical power, a transfer switch configured to receive the clean alternating current electrical power from the controller and at least one of grid power from an electrical grid, solar power from a solar panel assembly, or battery power from a battery, and configured to supply power to an electrical load. The controller is configured to control spark generation timing of the spark plug. The internal combustion engine, the alternator, and the controller are positioned within the cavity of the standby housing for protection from the external environment.

Still another exemplary embodiment relates to a standby generator including a standby housing defining a cavity and an internal combustion engine. The internal combustion engine includes an engine block including a cylinder comprising a piston, an engine housing at least partially covering the engine block, a crankshaft configured to rotate about a vertical crankshaft axis in response to movement by the piston, and a spark plug configured to periodically generate a spark to ignite fuel in the cylinder to control the movement of the piston. The standby generator also includes an alternator comprising a rotor and a stator, the rotor configured to rotate with the rotation of the crankshaft to generate alternating current electrical power, a battery configured to supply power to the alternator, and a controller including a rectifier configured to convert the alternating current to a direct current and an inverter configured to convert the direct current to a clean alternating current electrical power. The rotor is further configured to rotate the crankshaft using power from the battery to start the internal combustion engine. The internal combustion engine, the alternator, and the controller are positioned within the cavity of the standby housing for protection from the external environment.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
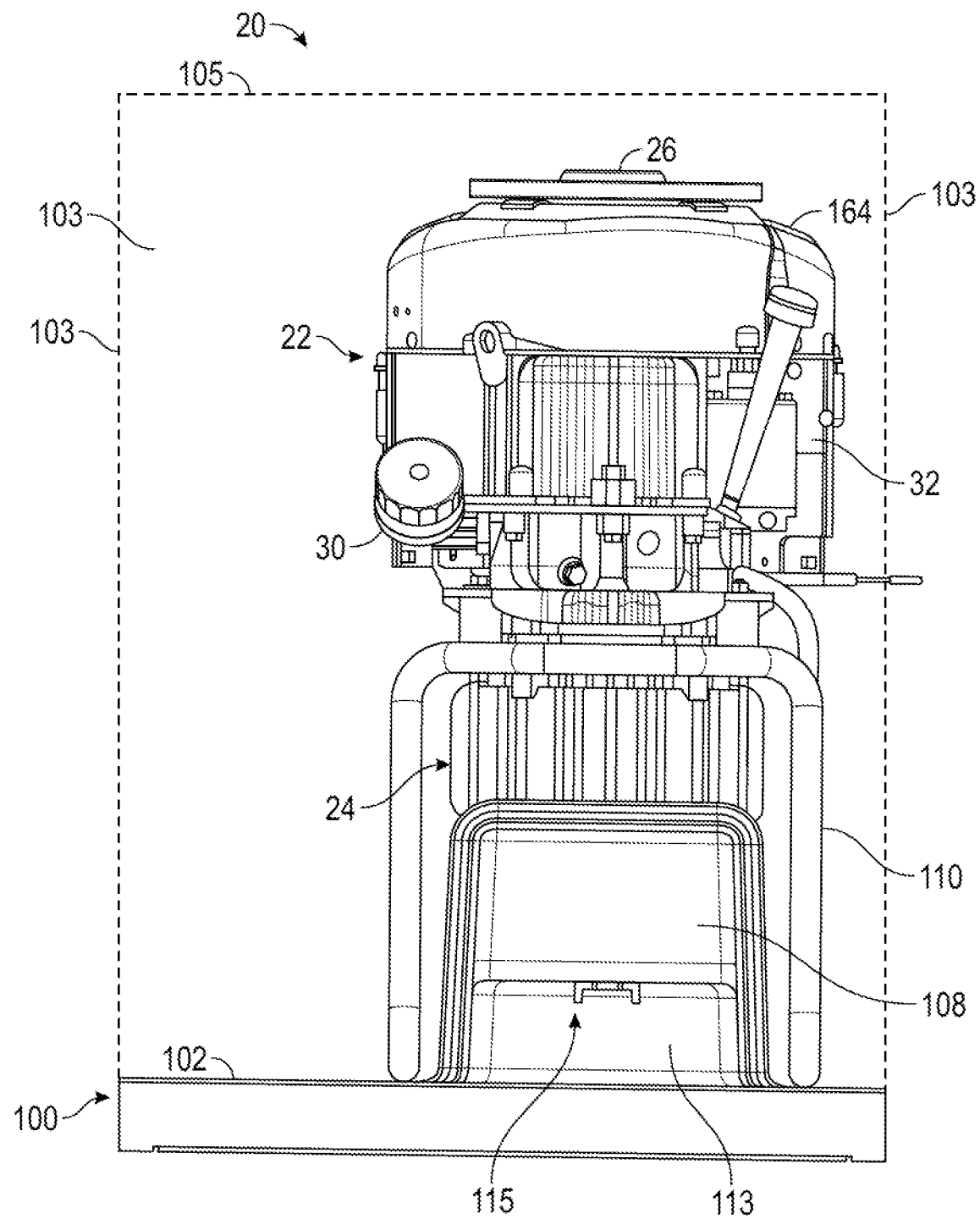
FIG. 1 is a rear view of a standby generator, according to an exemplary embodiment.
Figure 2:
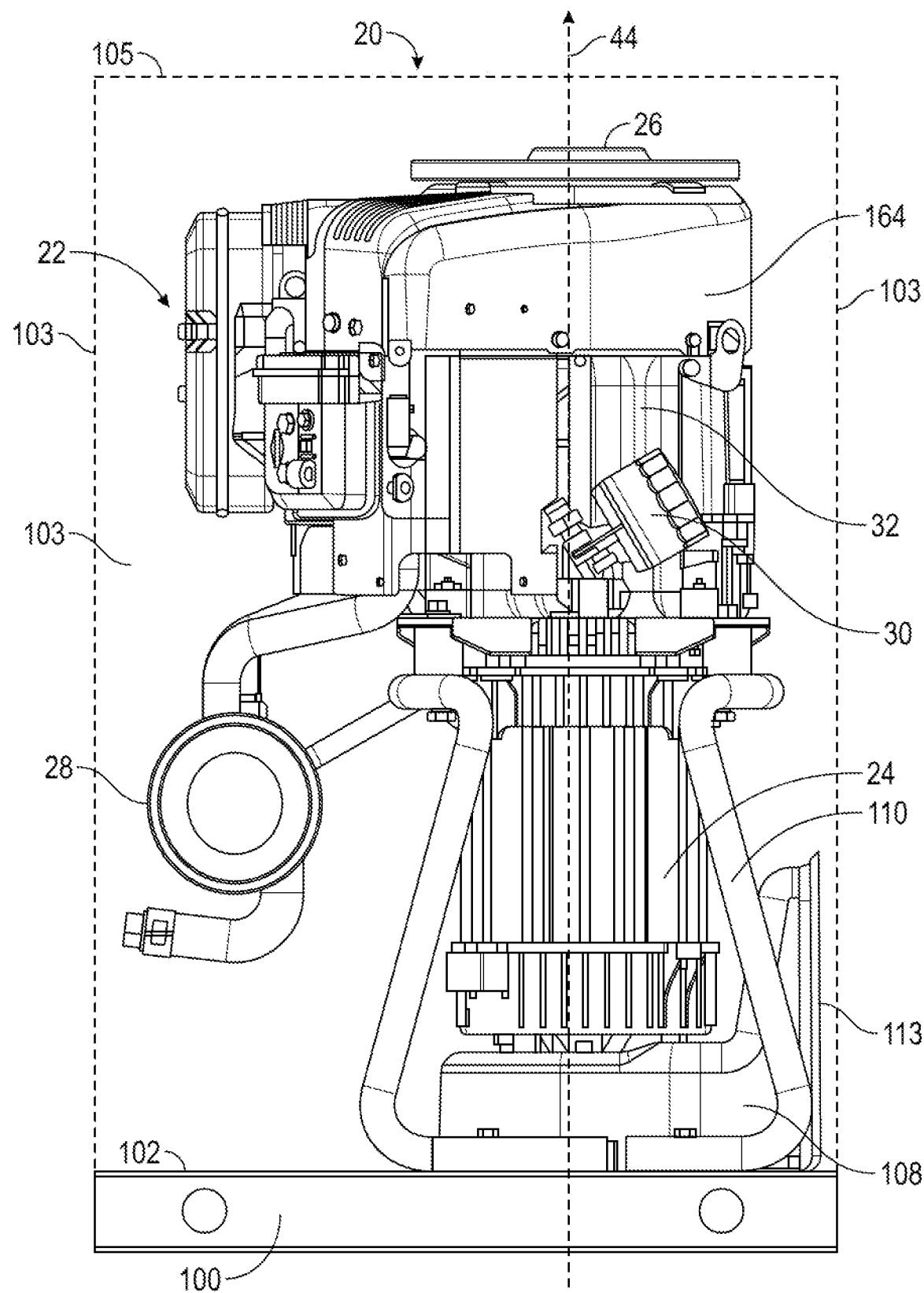
FIG. 2 is a side view of the standby generator of FIG. 1.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, a standby inverter generator is shown according to an exemplary embodiment. Inverter generators output alternating current (AC) and that current is then converted to direct current (DC), and then inverted back to clean AC power that maintains a pure sine wave at the required voltage and frequency (e.g., 120V at 60 Hz). On an inverter generator, the engine is connected to an alternator. The alternator produces AC power from the rotary motion produced by the engine and provides the AC power to a rectifier. The rectifier converts the AC power to DC power and provides the DC power to capacitors. The capacitors smoothen (e.g., filter) the DC power, which can then be inverted back into clean AC power at the desired frequency and voltage. The resultant AC power produced by the inverter generator is much cleaner power (i.e., purer sine waves) than is typical with a conventional generator. Using inverter generators, sensitive devices like microprocessors can be supplied with electricity produced by the inverter generator. Supplying devices with a relatively poor quality of electricity may damage a device or cause the device to malfunction. Accordingly, inverter generators may be useful to provide AC power in certain applications (e.g., to power medical devices, high performance computers, etc.) that traditional generators may not be suitable for.

The inverter generators shown and described throughout this application are also more fuel efficient than conventional generators. The inverter generators shown and described herein can adjust engine speed (e.g., drive shaft rotational speed) to meet a required electrical power load. Accordingly, when relatively low power loads are experienced, the engine speed can be reduced, which in turn lowers the fuel consumption of the generator as well as the emissions produced by the generator. Inverter generators may also reduce noise relative to conventional generators. Quieter engines, special mufflers, and sound-dampening technology may be used on inverter generators to reduce noise relative to conventional generators. In addition, conventional units generally run at a constant speed to produce electricity with the desired characteristics. Accordingly, a constant noise is produced by conventional generators. Because inverter generators can adjust the electrical characteristics of the power produced by the inverter generator, the engine within the inverter generator can throttle back when the load is light to save fuel and reduce noise caused by the unit.

Referring to FIGS. 1-4, a standby inverter generator 20 is shown according to an exemplary embodiment. The inverter generator 20 includes an internal combustion engine, shown as engine 22, an alternator assembly 24, a controller 26, a muffler 28, and a fuel connection 30. The inverter generator 20 is positioned within and coupled to a standby housing 100, which is configured to be positioned alongside a home or building. As depicted in FIGS. 1-3 and 5 and explained in detail below, the inverter generator 20 is coupled to a floor panel 102 of the standby housing 100.

Figure 4:
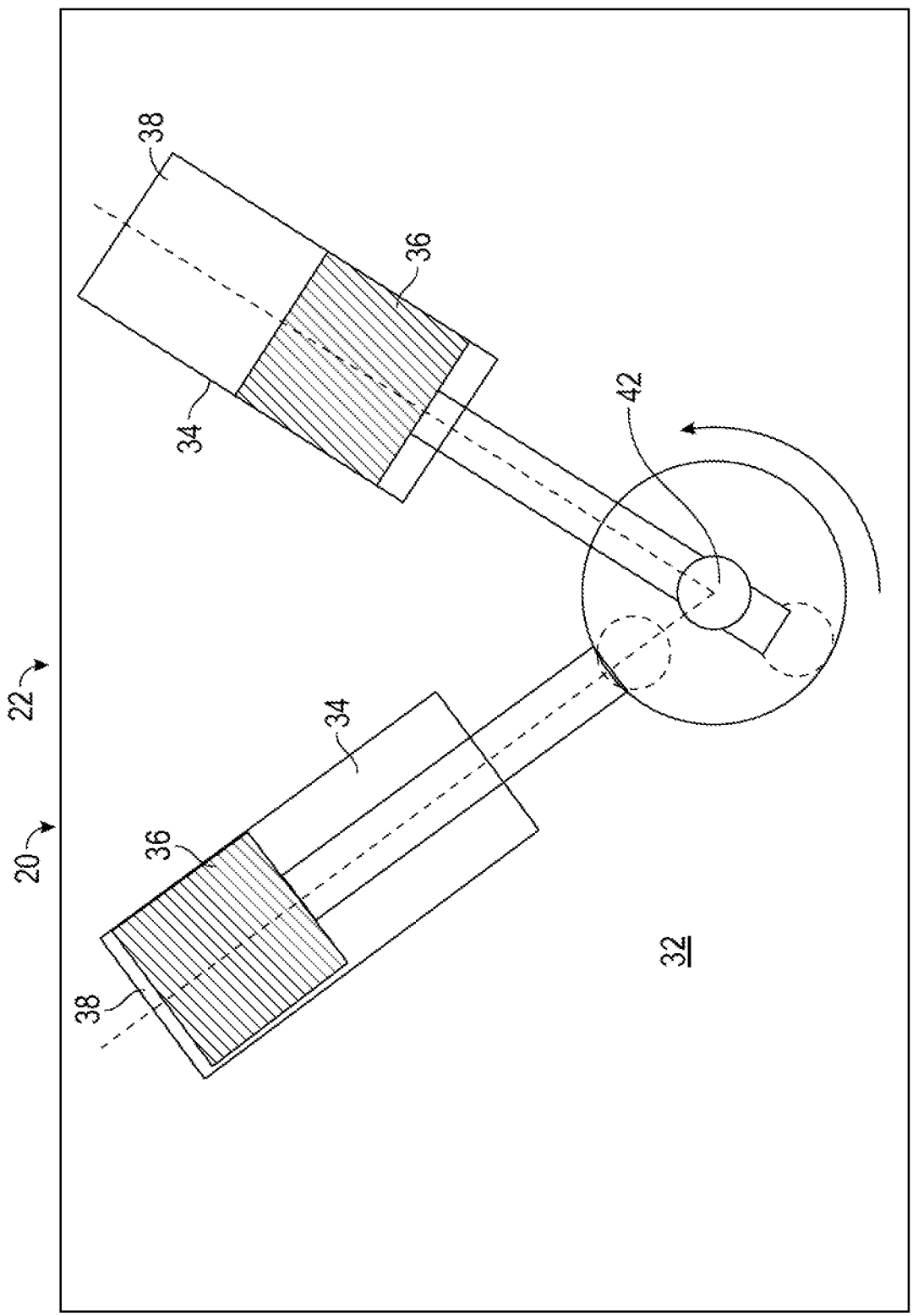
FIG. 4 is a schematic view of a twin cylinder assembly present in the standby generator of FIG. 1.

To generate electricity, the engine 22 draws fuel through the fuel connection 30 and into an engine block 32. Fuel is directed through the engine block 32 into one or more cylinders 34, which house pistons 36. Fuel is supplied into cylinder heads 38 (e.g., with an injector, like an electronic fuel injector (EFI)), mixed with air, and compressed between the cylinder head 38 and piston 36. The gaseous fuel and air mixture is then ignited by a spark plug (not shown) that extends into the cylinder head 38. Ignition of the fuel and air within the cylinder head 38 causes the gases within the cylinder head 38 to rapidly expand, which drives the piston 36 away from the cylinder head 38 and along a cylinder axis 40 defined by the cylinder 34 the piston 36 is received within. The coupling between the pistons 36 and a crankshaft 42 of the engine 22 causes the crankshaft 42 to rotate about its vertical crankshaft axis 44 in response to piston movement about the cylinder axes 40. As depicted in FIG. 4, the engine block 32 defines two cylinders 34 that are angularly offset from one another (e.g., arranged in a V-shape) about the crankshaft axis 44. Exhaust from the gaseous fuel and air ignition is directed outward from cylinder head 38 through the muffler 28.

The rotary motion of the crankshaft 42 about the crankshaft axis 44 caused by the reciprocating pistons 36 can then be used by the alternator assembly 24 to generate electricity. The alternator assembly 24 includes a stator 46 and a rotor 48. The rotor 48 is coupled to the crankshaft 42 so that the rotor 48 rotates in unison with the crankshaft 42. In some examples, the rotor 48 includes magnets (e.g., permanent magnets) extending around a portion of the rotor 48 to produce magnetic fields within the alternator assembly 24. As the rotor 48 rotates within the stator 46, the magnetic fields created by the magnets on the rotor 48 rotate as well to produce a rotating magnetic flux. The stator 46 includes a series of coils 50 (e.g., turned copper wire) spaced about its circumference to interact with and electromagnetically oppose rotational motion of the rotor 48. Accordingly, when the rotor 48 and associated magnets rotate within the stator 46, the rotating magnetic flux produced by the rotor 48 will induce a current within the coils 50. The spacing between the magnets on the rotor 48 and the coils 50 within the stator 46 and the rotary motion of the rotor 48 generates an AC electrical power output.

Figure 10:
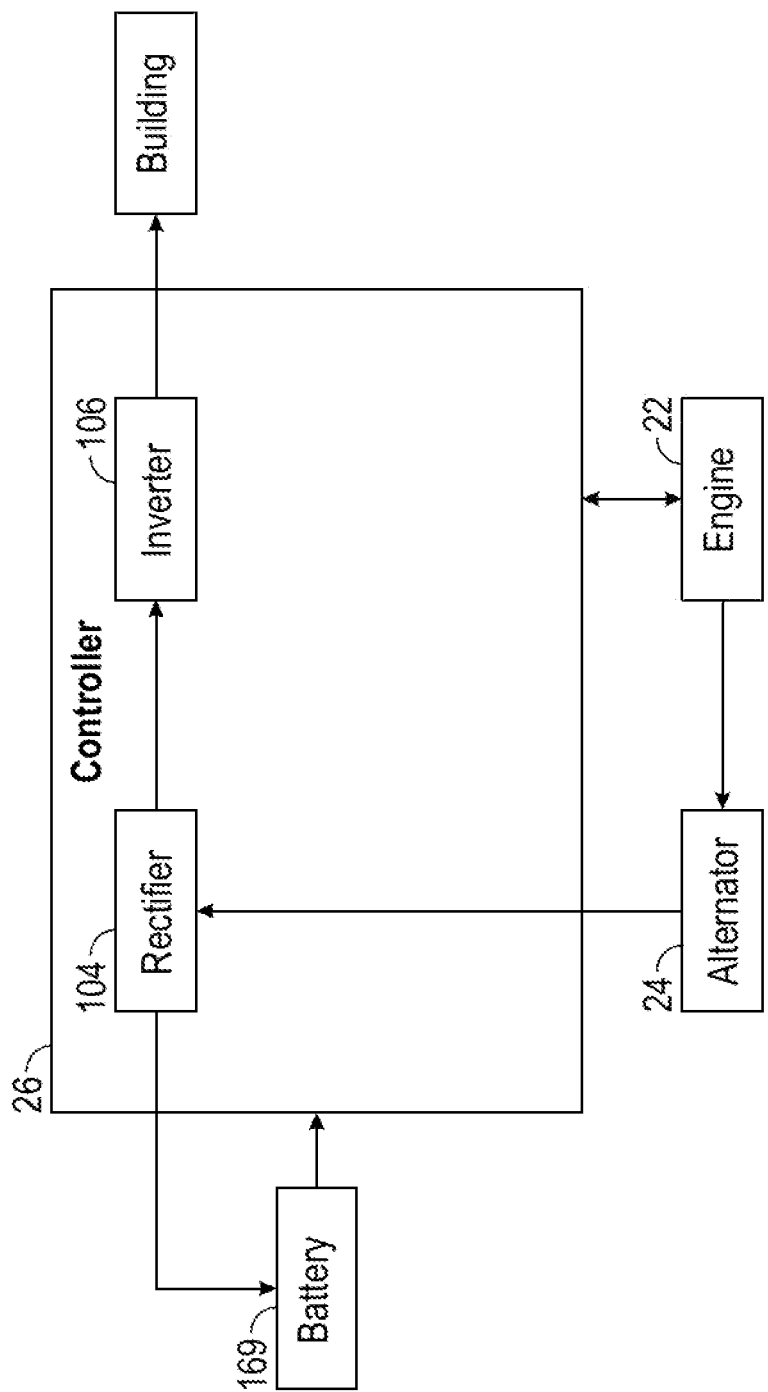
FIG. 10 is a schematic view of a controller of the standby generator of FIG. 1.

The AC electrical power output by the alternator assembly 24 is directed upwardly along one or more wires to the controller 26. As depicted in FIG. 10, the controller 26 includes both a rectifier 104 and an inverter 106 to transform and condition the AC electrical power received from the alternator assembly 24. AC electrical power is first delivered to the rectifier 104, which transforms the AC electrical power to DC power. The DC power is then provided from the rectifier 104 to the inverter 106. The inverter 106 inverts the DC power from the rectifier into a cleaner (e.g., higher quality) and more widely useful AC electrical power at a desired frequency and voltage (e.g., 120 VAC at 60 Hz). The generated three phase AC electrical power can then be output from the standby inverter generator 20 and used to power various electronics and building systems. The inverter 106 can be neutral bonded to a ground wire (not shown).

Returning to FIGS. 1-4 and with additional reference to FIGS. 5-9 and 11, the structure of the standby inverter generator 20 is shown in additional detail. As explained above, the standby inverter generator 20 is coupled to the floor panel 102 of the standby housing 100. The standby inverter generator 20 can be coupled to and supported by multiple structures that are bolted or otherwise removably coupled to the floor panel 102. For example, an alternator stand 108 and a tubular frame 110 can be fastened to the floor panel 102 to securely but removably mount the standby inverter generator 20 to the standby housing 100.

The alternator stand 108 can be a molded or bent sheet metal housing defining a mounting flange 109 and an alternator seat 111 offset from the mounting flange 109. The mounting flange 109 defines a series of apertures that can receive one or more fasteners to mount and secure the alternator stand 108 to the floor panel 102. In some examples, the alternator stand 108 has an open end 113 that extends upwardly away from the floor panel 102 to define a fluid flow path into and through a cavity 115 formed beneath the alternator seat 111. With the alternator stand 108 positioned along an edge of the floor panel 102, the open end 113 of the alternator stand 108 can serve as a cooling air intake flow path that funnels and directs air entering the standby housing 100 inward, beneath the alternator stand 108, and into or along the outer surface of the alternator 24 to provide cooling. To maximize the cooling air intake through the open end 113 of the alternator stand 108, the alternator stand 108 (and standby inverter generator 20) can be positioned so that the open end 113 faces a prevailing wind direction (e.g., the open end 113 faces westward). In some examples, a fan (not shown) is provided within the cavity 115 to further drive cooling air upward into and along the alternator assembly 24 and toward the engine 22 and inverter 106.

The tubular frame 110 can include one or more sections 112 of tubing that are bent into a desired shape to suspend and support a portion of the standby inverter generator. For example, the tubular frame 110 can be formed from two symmetrical (e.g., identical) and opposing sections 112 that are positioned adjacent one another on the floor panel 102. In some examples, an end of each section 112 of the tubular frame is designed to telescope with an opposing end of the other section 112 to create a secure yet releasable coupling between the sections 112.

As depicted in FIGS. 1-3 and 5-6, each section 112 of the tubular frame 110 defines two legs 114 and a mounting support 116 that extends upwardly away from the legs 114. The legs 114 extend along the floor panel 102 (e.g., coplanar with the floor panel 102) and define one or more apertures to receive mounting hardware (e.g., fasteners) to secure the tubular frame 110 to the floor panel 102 of the standby housing 100. In some examples, the legs 114 of each section 112 of the tubular frame 110 extend approximately parallel to one another. The mounting support 116 of the tubular frame 110 bends upwardly away from each leg 114 to a mounting height that is vertically offset from the floor panel 102. A support bridge 118 is formed within the mounting support 116 at the mounting height and spans the horizontal distance between the legs 114. The support bridge 118 can extend approximately parallel to the floor panel 102, and can be provided with a curvature to mimic or follow a curvature defining a perimeter of the alternator assembly 24, as explained below.

Bosses 120 are formed along the support bridge 118 to receive and support the alternator assembly 24. For example, four bosses 120 can be positioned about the support bridges 118 of the tubular frame 110. The bosses 120 each support or otherwise receive a locating feature (e.g., a fastener, dowel, an aperture, etc.) to help position the alternator assembly 24 relative to the tubular frame 110. Threaded rods 122 (e.g., set screws, molded bolts, captive screws, etc.) can be molded or anchored to the bosses 120 to serve as both locating and coupling features that can be used to secure the standby inverter generator 20 to the floor panel 102 of the standby housing 100. In some examples, the threaded rods 122 are exposed, threaded sections of fasteners that are embedded into the bosses 120.

The alternator stand 108 and the tubular frame 110 together receive and support the engine 22, the alternator assembly 24, the controller 26, the muffler 28, and the fuel connection 30. The alternator stand 108 and tubular frame 110 are shaped to facilitate the assembly of the standby inverter generator 20 within the standby housing 100 at a desired location (e.g., a home or building where the standby inverter generator 20 will be used). As explained earlier, the alternator stand 108 is first mounted to the floor panel 102 of the standby housing 100 at a location in which the open end 113 of the alternator stand 108 engages or abuts a side panel (e.g., side panel 103, shown in FIG. 2) of the standby housing 100. Once the alternator stand 108 has been secured to the floor panel 102, the tubular frame 110 can be secured to the floor panel 102 as well. The legs 114 of the tubular frame 110 straddle the alternator stand 108. The gap between the support bridges 118 of the tubular frame 110 can be approximately centered over the circular alternator seat 111 of the alternator stand 108.

Figure 5:
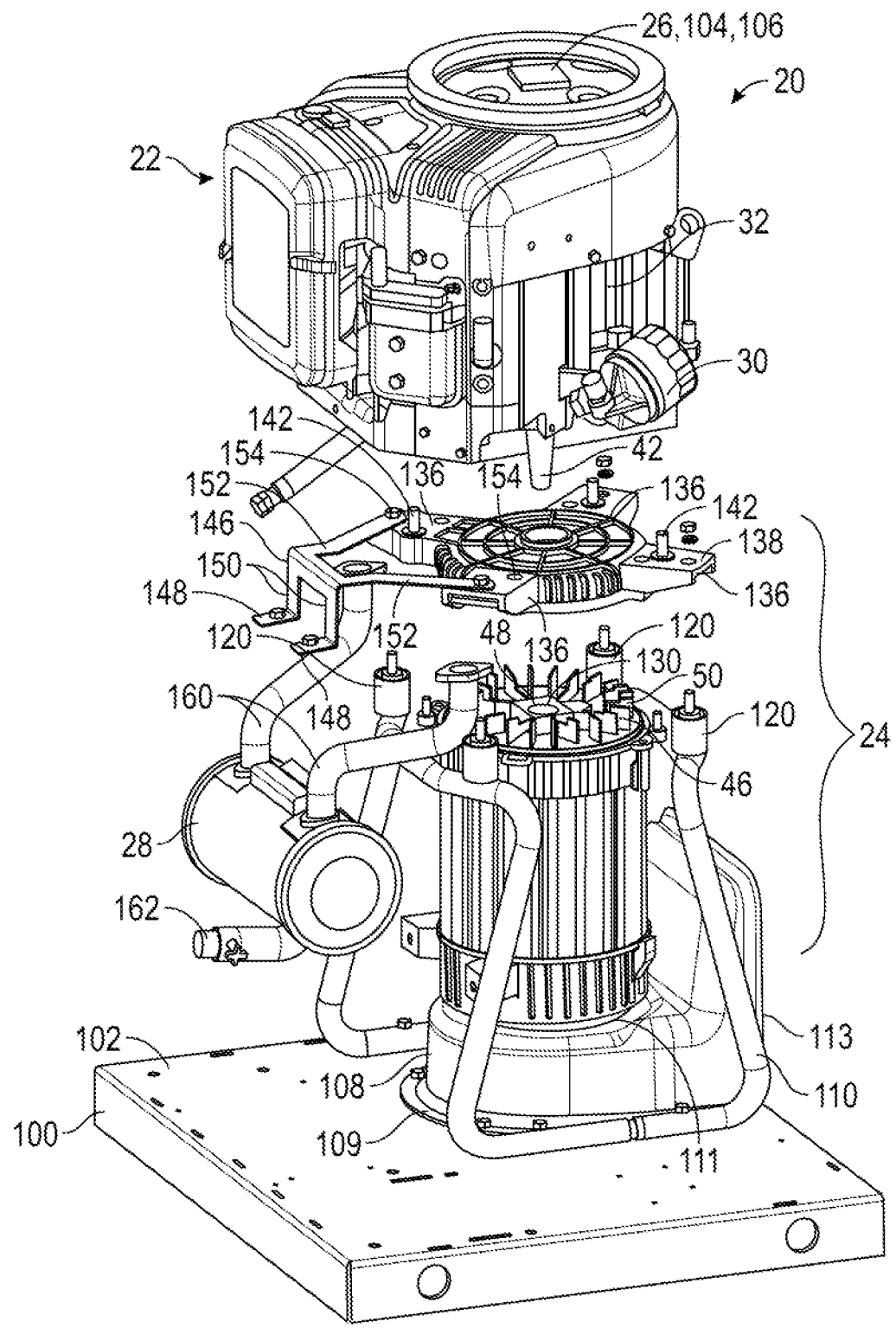
FIG. 5 is a partial exploded view of the standby generator of FIG. 1.
Figure 6:
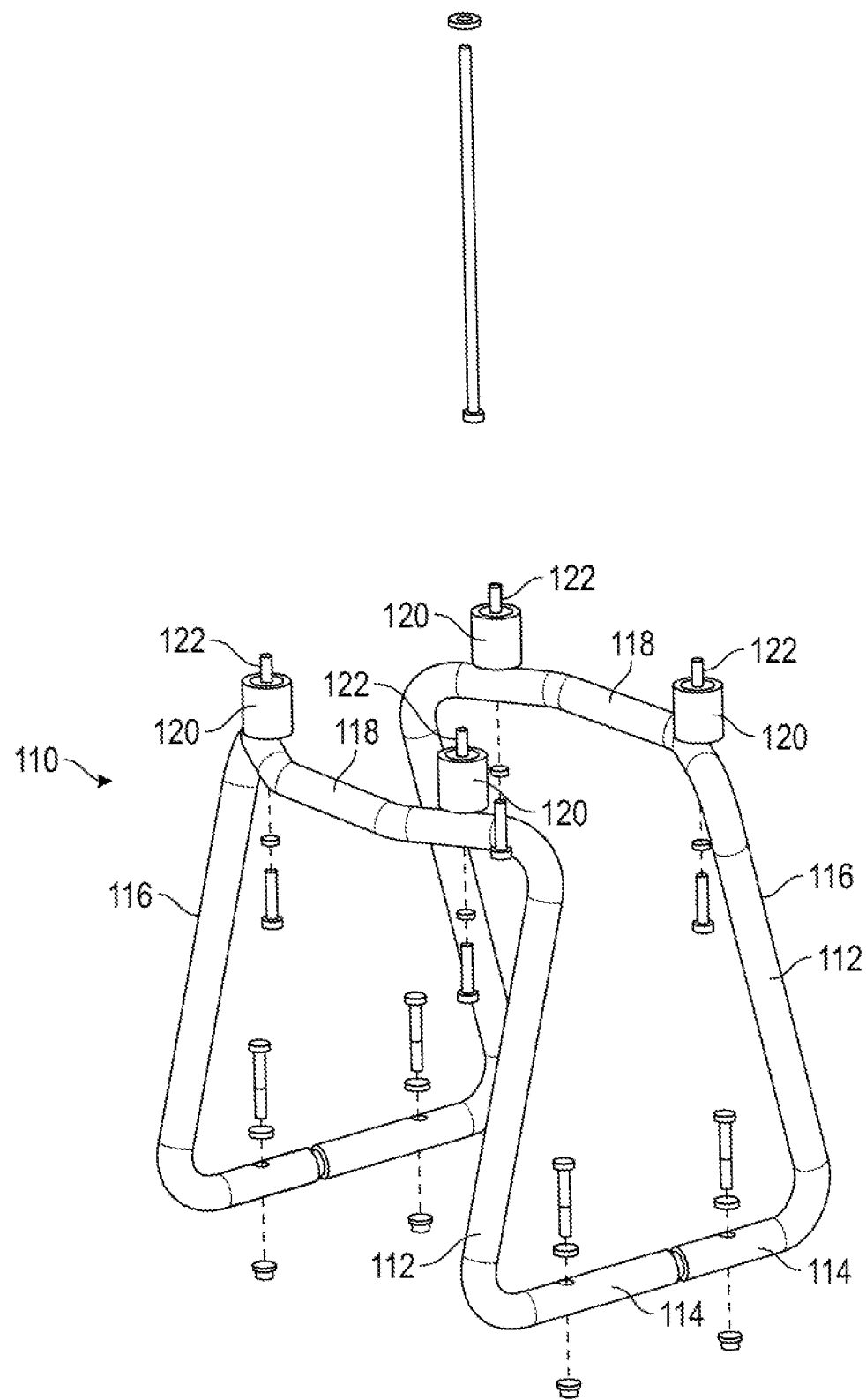
FIG. 6 is a perspective view of a tubular frame of the standby generator of FIG. 1.
Figure 8:
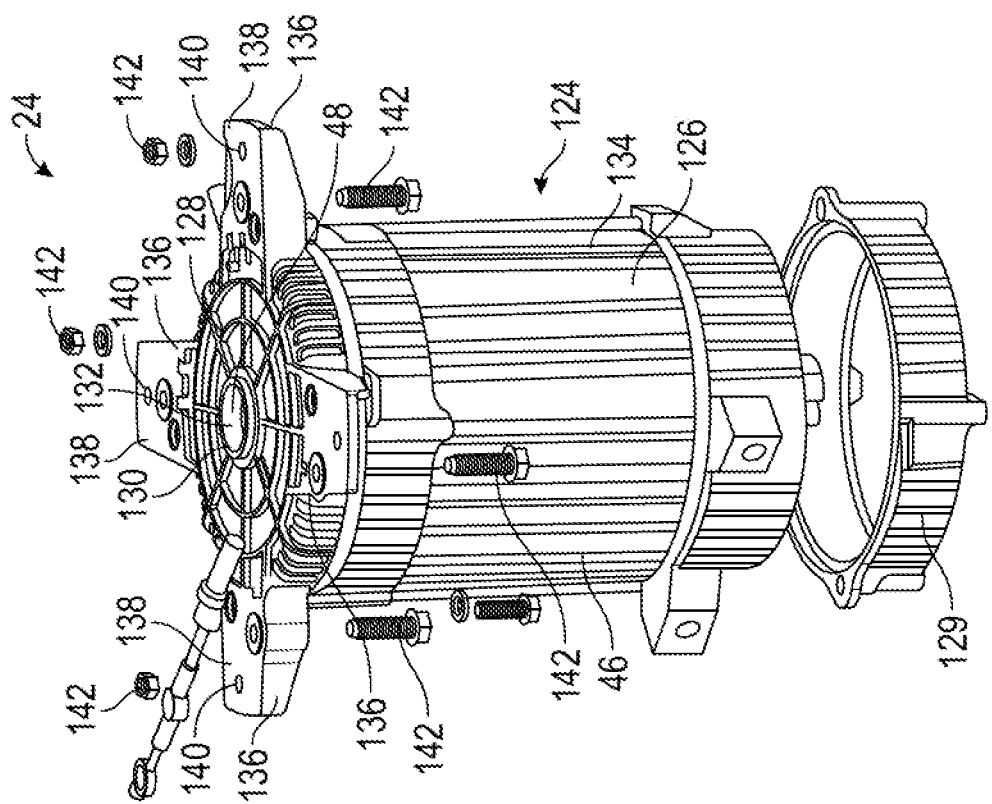
FIG. 8 is a perspective view of an alternator assembly of the standby generator of FIG. 1.

With the alternator stand 108 and tubular frame 110 mounted in place on the floor panel 102, the alternator assembly 24 can be lowered into position. The alternator assembly 24 includes a generally cylindrical body 124 defined by a cylindrical housing 126 and end caps 128, 129. The cylindrical housing 126 has a generally smooth interior that defines a cylindrical power generation cavity 130. The power generation cavity 130 receives the rotor 48 and stator 46. As depicted in FIG. 5, the coils 50 of the stator 46 extend circumferentially around the outside surface of the power generation cavity 130. The rotor 48 extends into the power generation cavity 130 within a central recess 132 defined by the coils 50 that is coaxial with the crankshaft axis 44. The external surface of the cylindrical body 124 includes a series of cooling fins 134 that extend along the body 124 approximately parallel to the crankshaft axis 44. In some examples, the underside of the cylindrical housing 126 (e.g., the portion of the housing 126 supported on the alternator seat 111) and the alternator seat 111 can define one or more passages to receive and direct cooling airflow from the cavity 115 beneath alternator stand 108 upward into and around the alternator assembly 24. The cooling airflow can rise upward, through the power generation cavity 130 and outwardly along the cooling fins 134 of the cylindrical housing 126 to direct heat upwardly away from the alternator assembly 24.

The end cap 128 has an annular shape that can be secured to the cylindrical housing 126 to seal the alternator assembly 24. The end cap 128 defines a rotor passage that is centered above the central recess 132 (e.g., aligned with the crankshaft axis 44) to receive a portion of the rotor 48. In some examples, a portion of the rotor 48 extends upward, through the rotor passage and outward from the alternator assembly so that a coupling can be formed between the crankshaft 42 and the rotor 48. The coupling formed between the crankshaft 42 and the rotor 48 allows the crankshaft 42 and rotor 48 to rotate in unison (e.g., at identical angular velocities) and transmits torque on the crankshaft 42 (e.g., from reciprocating piston 36 motion) to the rotor 48. The rotor 48 and crankshaft 42 can extend collinear along the crankshaft axis 44.

Mounting wings 136 extend outwardly from a top of the end cap 128 to help locate and secure the cylindrical housing 126 of the alternator assembly 24 to the tubular frame 110. The mounting wings 136 can be equally spaced about a perimeter of the end cap 128 (e.g., positioned about 90 degrees apart from one another) to help promote a secure coupling between the end cap 128 and the tubular frame 110. The mounting wings 136 each define a shelf 138 that extends away from a top of the end cap 128. In some examples, the shelf 138 extends approximately parallel to the floor panel 102 below. The shelves 138 each define a hole 140 that can be used to locate the end cap 128 and alternator assembly 24, more generally, with the tubular frame 110. To facilitate coupling between the alternator assembly 24 and the tubular frame 110, the holes 140 within the shelves 138 can be aligned with the threaded rods 122 protruding upwardly from the bosses 120 formed on the support bridges 118 of the tubular frame 110. As the end cap 128 is lowered toward the floor panel 102, the threaded rods 122 extend through the holes 140 and upwardly beyond each shelf 138. While an underside of the shelf 138 can be seated on the boss 120, the exposed portion of the threaded rod 122 can receive a fastener 142 (e.g., a nut and lock washer) that can be torqued to secure the end cap 128 to the tubular frame 102 to mount the alternator assembly 24 into place within the standby housing 100. In some examples, the shelves 138 further support engine locating features, shown as dowels 144, to help complete the assembly of the standby inverter generator 20.

Figure 7:
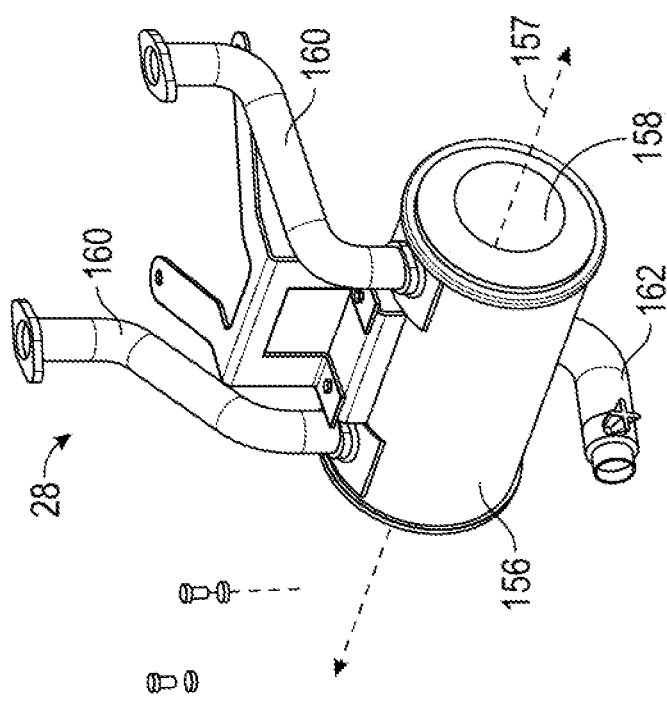
FIG. 7 is a perspective view of a muffler of the standby generator of FIG. 1.
Figure 9:
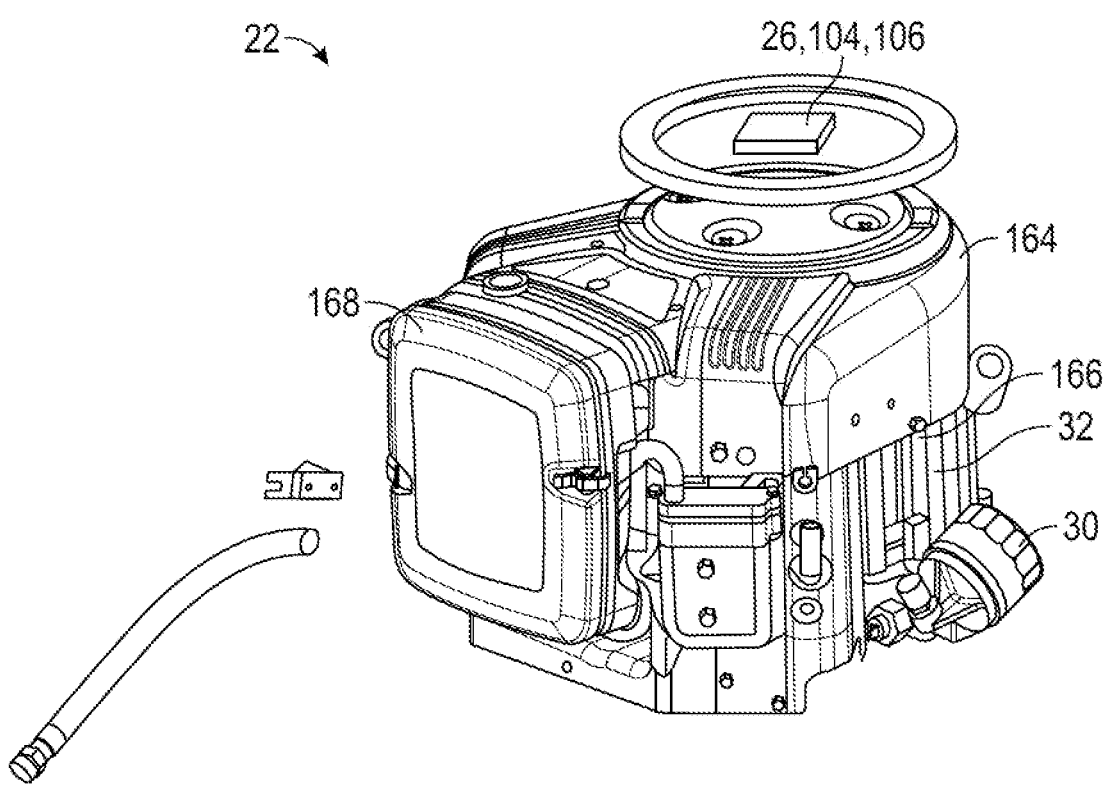
FIG. 9 is a perspective view of an engine housing of the standby generator of FIG. 1.

As depicted in FIGS. 1-3, 5, and 7, the shelves 138 and threaded rods 122 (e.g., shanks of imbedded screws) from the bosses 120 can also be used to mount and secure the muffler 28 to the tubular frame 110 and the standby inverter generator 20. A bracket 146 is mounted to a top side of the muffler 28 to mount the muffler 28 in a location spaced apart from other heat generating or heat sensitive components (e.g., the engine 22 and the alternator assembly 24). Accordingly, the bracket 146 can serve as a heat shield to prevent the transfer of heat within the muffler 28 to the engine 22 that may otherwise cause damage to wear parts within the engine 22 (e.g., engine crankshaft oil seals, etc.). The bracket 146 also provides a pathway for cooling air to approach the muffler 28 from multiple directions simultaneously. The bracket 146 is defined by an H-shape that includes two mounting tabs 148 coupled to a top of the muffler 28. Legs 150 extend upwardly and perpendicularly away from the mounting tabs 148. Arms 152 then extend outwardly and perpendicularly away from the legs 150. The spacing between the arms 152 can be variable (e.g., the spacing changes as the arms 152 extend away from the legs 150). As depicted in FIG. 7, the arms 152 taper outwardly away from one another to achieve a spacing that is approximately equal to the spacing between the bosses 120 on the tubular frame 110. Holes 154 are formed through distal portions of the arms 152 to receive the threaded rods 122. Accordingly, two of the threaded rods 122 and nuts may be used to support and secure both the bracket 146 and the mounting wings 136 of the end cap 128 to the tubular frame 110 simultaneously.

The muffler 28 includes a generally cylindrical body 156 that defines a muffler chamber 158. The generally cylindrical body 156 extends along a muffler axis 157 that is approximately (e.g., within 5 degrees) perpendicular to the crankshaft axis 44. Conduits 160 (e.g., hoses, pipes, tubes) extend away from the muffler chamber 158 to fluidly couple the muffler 28 with the cylinder heads 38 of the engine 22. Exhaust gases from combustion within the cylinders 34 are pushed by the piston 36 outward from the cylinder head 38, through the conduits 160, and into the muffler chamber 158. Within the muffler chamber 158, the exhaust gases are passed through a series of baffles or other sound muffling devices (e.g., tubes, resonating chambers, etc.) that help dampen and dissipate noise generated by the engine 22. After passing through the muffler chamber 158, the exhaust gases are directed outward from the standby inverter generator 20 through an exhaust pipe 162 extending outwardly away from the cylindrical body 156, and into the external environment (or within the standby housing 100). In some examples, an exhaust port 163 (shown in FIG. 11) is formed within one of the side panels 103 of the standby housing 100 to release the exhaust gases from the exhaust pipe 162 outward from the standby housing 100 to alleviate heat within the standby housing 100.

Referring now to FIGS. 1-5 and 9, the engine 22 is shown. The engine 22 generally includes an engine housing or blower housing 164 that defines an engine cavity 166. The engine block 32 of the engine 22 is at least partially received within the engine cavity 166 and is at least partially covered by the engine housing 164. The engine housing 164 can further define a battery box 168. The battery box 168 can be positioned between the cylinders 34 within the engine block 32, and can be used to house an on-board battery (e.g., battery 169, shown in FIG. 10). The on-board battery can be an absorbent glass mat (AGM) battery, for example, which supplies electrical power to the spark plugs to ignite the fuel and air mixture within the cylinders 34 to start the engine 22. In some instances, the battery can also be used as a booster to help supply electricity when a spike in generator load is requested. The battery can supply DC electrical power to the inverter 106, which can then be inverted to AC power and output for use. The battery box 168 can be positioned between the cylinders 34 and proximate the cylinder heads 38, which simplifies the electrical flow path between the battery and the spark plugs within the cylinder heads 38. Various other electronics can be positioned within the battery box 168 as well.

Figure 11:
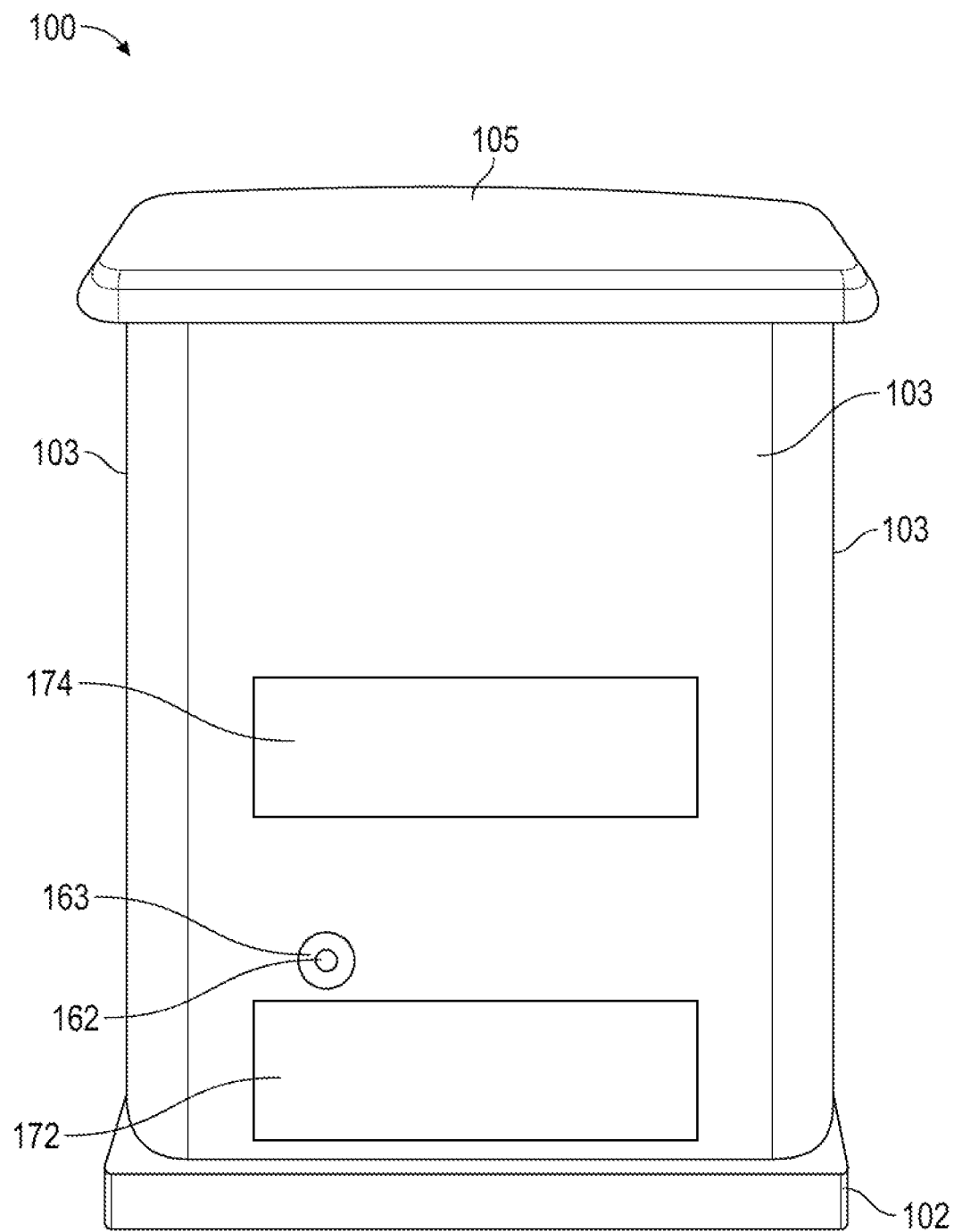
FIG. 11 is a front perspective view of a standby housing associated with the standby generator of FIG. 1.
Figure 12:
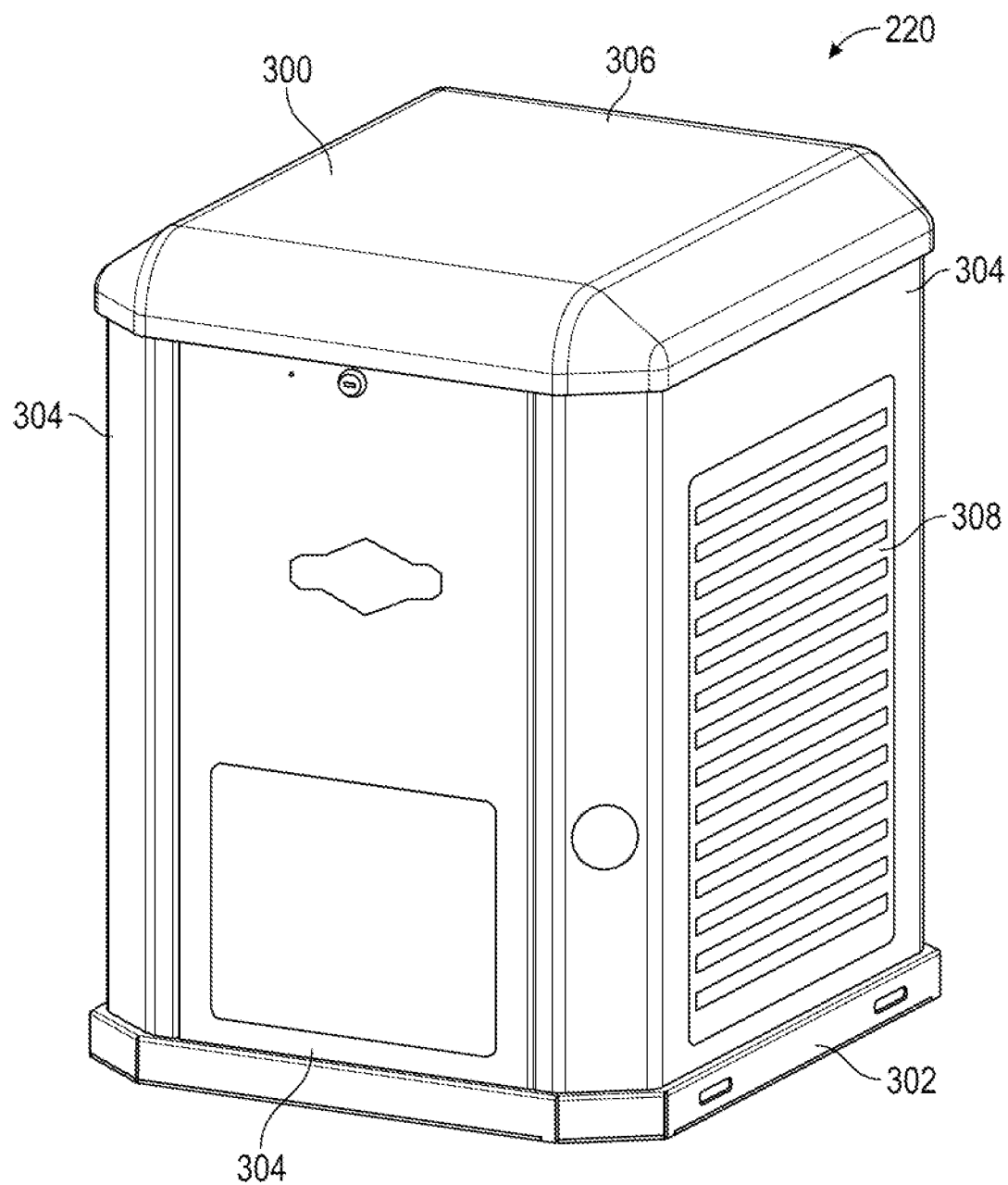
FIG. 12 is a front perspective view of a standby housing associated with another standby generator, according to an exemplary embodiment.
Figure 13:
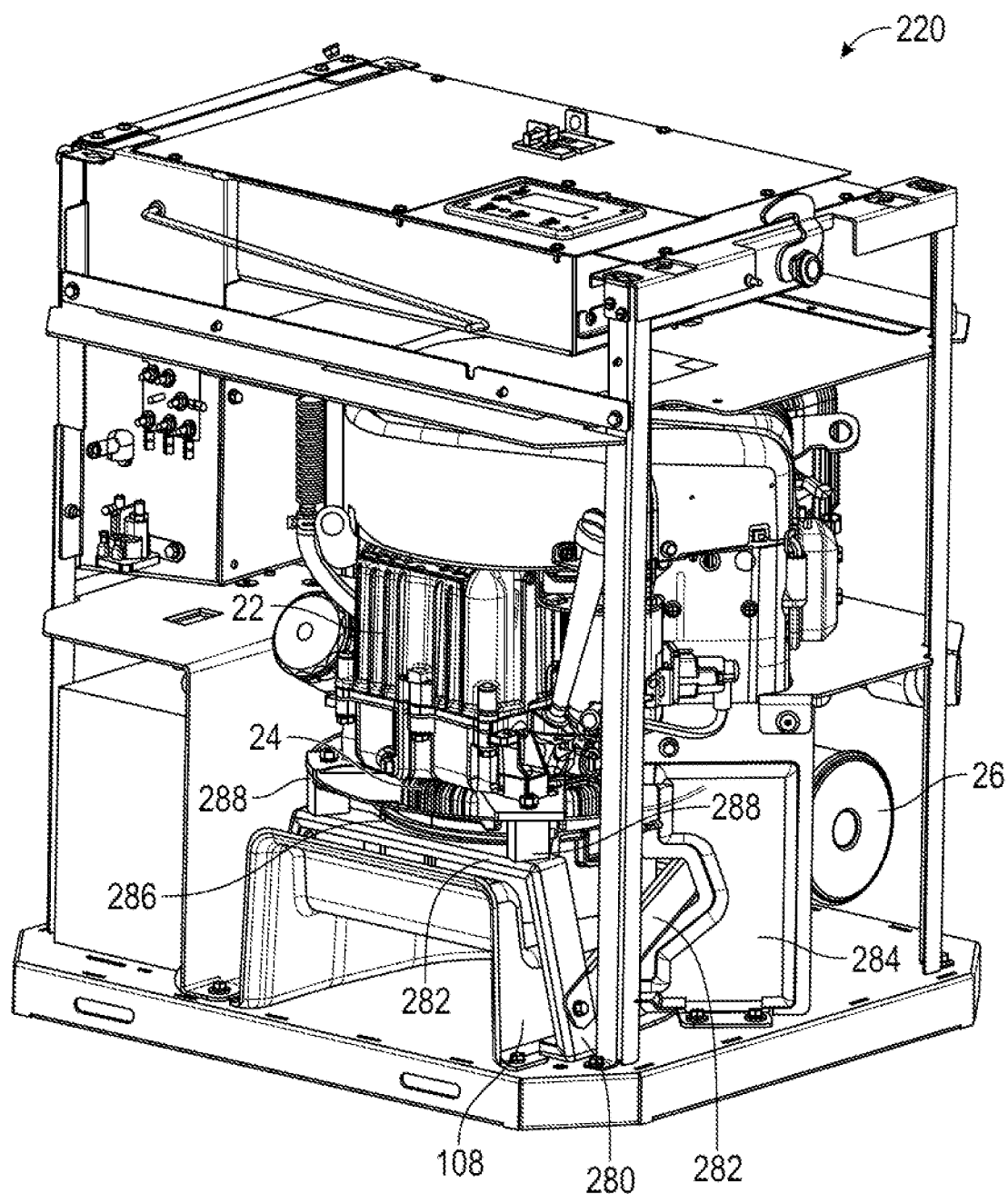
FIG. 13 is a perspective view of the standby generator of FIG. 12, with the standby housing removed.

With additional reference to FIG. 11, the standby housing 100 is shown in additional detail. As explained above, the standby housing 100 generally includes a floor panel 102, side panels 103 extending upwardly away from the floor panel 102, and a cover 105 that together define a cavity. The floor panel 102, side panels 103, and cover 105 together surround the standby inverter generator 20 to protect the standby inverter generator 20 from the external environment (e.g., dust, rain, wind, etc.) In some examples, one or more of the side panels 103 define cooling air intakes to help direct cooling air from the external environment into cavity and along the various components of the standby inverter generator 20. As depicted in FIG. 11, the side panel 103 can include separate air intakes 172, 174 for the alternator assembly 24 and the engine 22. The air intakes 172, 174 can be spaced apart from one another vertically along the side panel 103. In some examples, the air intakes 172, 174 perform an air filtration function as well. The air intakes 172, 174 can be provided with filters or can be defined by one or more louvered panels to restrict the inward flow of contaminants through the side panel 103 and into contact with the standby inverter generator 20. In some examples, the floor panel 102 is fortified by one or more pieces of bar stock (not shown) that help maintain rigidity within the floor panel 102, particularly during travel.

Figure 3:
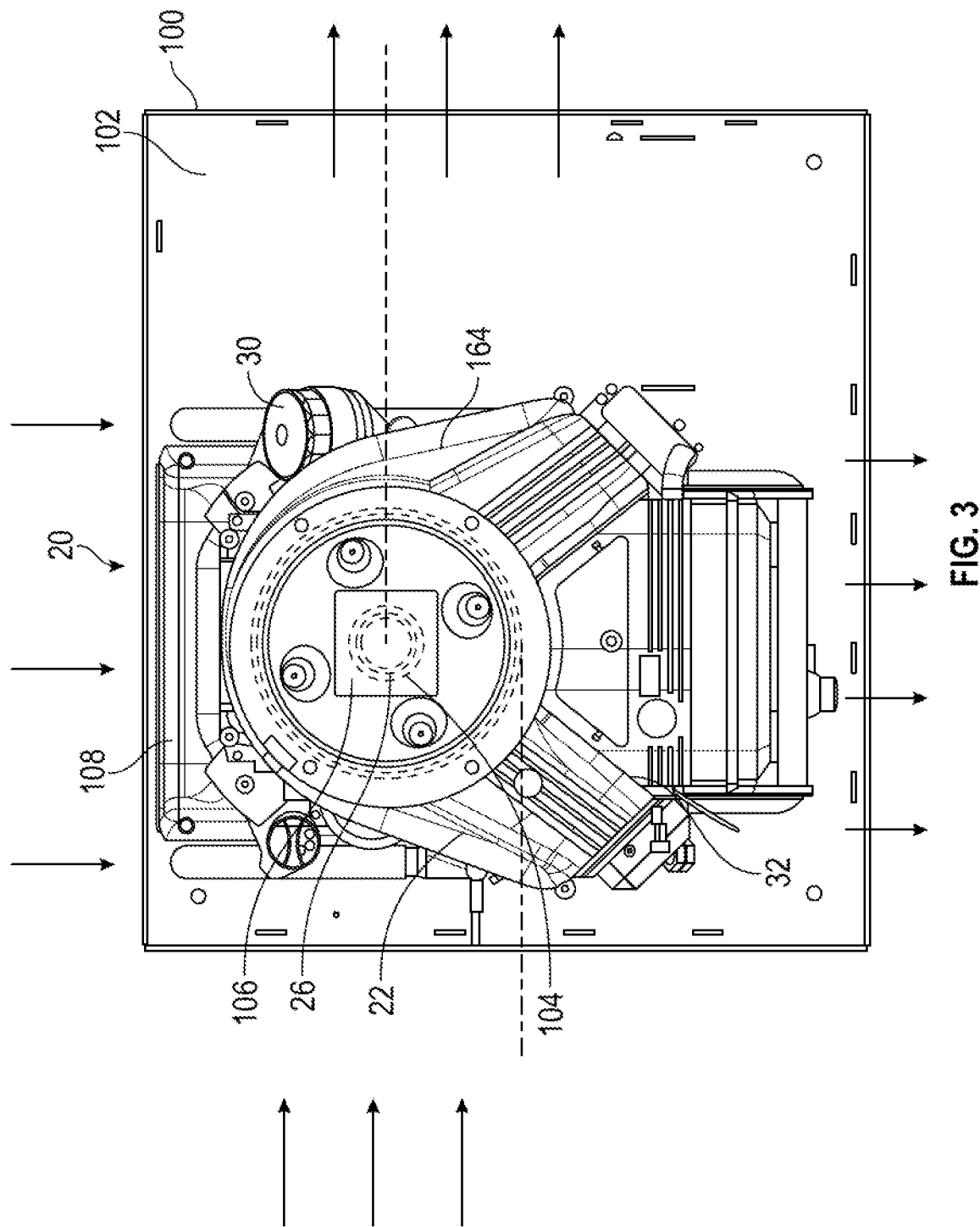
FIG. 3 is a top view of the standby generator of FIG. 1.

The controller 26 and inverter 106 are coupled to the engine housing 164. As depicted in FIGS. 3, 5, and 9-10, the controller 26 and inverter 106 are positioned above the engine block 32 and above the engine 22, generally. By placing the inverter 106 and controller 26 above the engine 22, the cooling airflow around these components can be maximized. Cooling air entering through the top of the standby housing 100 (e.g., within holes within the side panels 103 or beneath the cover 105) will be directed over and past the inverter 106 and controller 26 to remove heat generated by these components. Simultaneously, the cooling air entering from the bottom of the standby housing 100 will be directed upward as it heats up, and will once again pass over the inverter 106 and controller 26 as it rises and exits the standby housing 100. In some examples, the inverter 106, alternator assembly 24, and engine 22 all have separate air intakes. In some examples, once cooling air has passed over the inverter 106 and/or engine 22 and alternator assembly 24, the warmer air can exit through the air intakes 172, 174 formed in the side panel 103. As depicted in FIG. 3, two of the side panels 103 can serve as cooling air inlets, while the remaining side panels 103 (e.g., the side panel 103 that includes the exhaust port 163) can serve as cooling air outlets.

The controller 26 is in communication, generally, with the engine 22 and fuel delivery systems (e.g., fuel injectors receiving fuel from a fuel tank coupled to the fuel connection 30), as well as with various external sources. The controller can interact with and adjust a rate of fuel supply to the internal combustion engine 22 to adjust the speed of the internal combustion engine 22. In some examples, the controller 26 can be supplied with power from the battery within the battery box 168, so that the controller 26 remains active regardless of the current operational status of the engine 22. The controller 26 can also be provided with a control wire or signal in communication with an associated building power line, which can allow the controller 26 to actively monitor the power consumption within the building that the standby inverter generator 20 is associated with. If the controller 26 detects a surge or interruption in the power supply within the building, the controller 26 can initiate an ignition sequence for the engine 22 to begin operating.

The controller 26 is configured to operate the standby inverter generator 20 in various different modes to improve efficiency and decrease fuel consumption, noise, and emissions relative to conventional standby generators. Because the controller 26 is in communication with the control wire or signal from the building, the controller 26 can monitor the requested or required load to power devices within the building. Accordingly, the controller 26 optimizes the operation of the engine 22 so that only the necessary amount of power is outputted by the inverter generator 20 at a given time. By adjusting the engine speed and output, the controller 26 can operate the engine 22 so that the amount of AC electrical power generated by the standby inverter generator 20 is correlated to the requested load. In some examples, the controller 26 controls the standby inverter generator 20 to output an amount of AC electrical power that is greater than the current requested load by a threshold amount (e.g., 10% or 20% more) to accommodate additional power requests that may occur within the building instantaneously. The engine 22 is not governed at a specific angular velocity, which allows the standby inverter generator 20 to avoid waste and eliminates unnecessary fuel consumption and noise production.

The controller's 26 ability to adjust engine speed and output enables the use of different operational modes that further improve the efficiency of the standby inverter generator 20 while lowering the fuel consumption, emissions, and noise production. Under normal loading conditions, the controller 26 controls the engine 22 so that the pistons 36 within the cylinders 34 alternate and reciprocate to drive the crankshaft 42. The engine speed can be adjusted upward or downward by adjusting the rate of fuel delivery into the cylinders 34 in order to meet power load demands. In some examples, the controller 26 can be configured to operate the engine 22 to accommodate very low power load demands. When the requested power load is below a certain threshold value (e.g., less than 30% of maximum output of the standby inverter generator 20, etc.) the controller 26 may control the engine 22 so that only one of the two cylinders 34 operates. Accordingly, fuel will only be delivered to one of the two cylinders 34, and battery power will only be supplied to the spark plug positioned in one of the two cylinder heads 38. With only one of two cylinders 34 operating, the torque and rotational speed of the crankshaft and, as a result, the rotor 48 will be reduced. However, the controller 26 can maintain the engine speed such that even with a single cylinder 34 firing, the rotor 48 generates AC electrical power that can be supplied to the rectifier 104 and inverter 106 and outputted at the desired frequency and voltage. Accordingly, the controller 26 can control the engine to operate at much lower speeds (e.g., 1400 rpm) than conventional generators to still output the necessary amount of AC electrical power.

The selective operation of the cylinders 34 can also be used by the standby inverter generator 20 to execute "exercise mode" operations to maintain the readiness of the standby inverter generator 20. Periodically (e.g., once a week, once a month, once a quarter, etc.) the controller 26 can transition the standby inverter generator 20 to exercise mode in order perform routine exercise procedures. In the exercise mode, the controller 26 once again controls the engine 22 so that only a single cylinder 34 is operating. Alternatively, the engine 22 can be operated at a much lower frequency (e.g., 1400 RPM, 1800 RPM, etc.) using both cylinders 34. The lower output of the engine 22 and reduced angular velocity of the crankshaft 42 and rotor 48 can cycle fuel through the fuel system of the standby inverter generator 20 and generate an amount of electrical power that is below a rated capacity of the standby inverter generator 20. The electrical power generated by the standby inverter generator 20 in the exercise mode can be sufficient to partially or fully recharge the battery within the engine housing 164. Accordingly, the electrical power generated by the alternator assembly 24 can be provided to the rectifier 104 and diverted to the battery, rather than output through the inverter 106.

The controller 26 can activate or transition the standby inverter generator 20 to the exercise mode in a variety of ways. For example, the controller 26 may monitor the crankshaft 42. If a threshold time period has elapsed (e.g., one week, one month, 90 days, etc.) where the crankshaft 42 has remained idle, the controller 26 can initiate the exercise mode. The controller 26 can activate an ignition sequence by drawing electricity from the battery to power the fuel delivery system and spark plugs within one of the two cylinders 34. Once combustion has occurred within the cylinder 34 and the crankshaft 42 begins rotating, the power to operate the fuel delivery system and spark plugs can be diverted from the rectifier 104 to continue operation of the standby inverter generator 20. The controller 26 can continue to operate the engine 22 in the exercise mode until a threshold time period (e.g., fifteen minutes, one hour, etc.) has elapsed. Upon receiving an indication that the threshold time period has elapsed, the controller 26 can command the internal combustion engine 22 to cease operating. In some examples, the controller 26 disconnects the fuel delivery system and spark plugs from an electrical power supply to effectively shut down the engine 22.

The controller 26 can also be configured to output AC electrical power at different frequencies to accommodate different electrical power needs. By controlling the engine speed, the controller 26 effectively controls the angular velocity of the rotor 48. The relationship between the rotor 48 and stator 46 is such that varying the angular velocity of the rotor 48 can change the characteristics of the signal being output by the alternator assembly 24. In some examples, the inverter 106 is further configured to accept the DC electrical power from the rectifier 104 and invert the DC electrical power to clean 50 Hz AC electrical power. The inverter 106 can communicate with the controller 26 to adjust engine speed to accommodate a desired output characteristic of the electrical power from the standby inverter generator 20. The standby inverter generator 20 does not experience any derating due to the engine speed changes. Accordingly, the standby inverter generator 20 can be used in various locations and may be cross-compatible in both the United States and throughout several countries of the world.

The controller 26 can also be provided with preset operational parameters that can be selected by a user. For example, the engine 22 of the standby inverter generator 20 can be compatible with several fuel types (e.g., natural gas, propane, gasoline, etc.). Because the fuel sources have different relative energy densities, the rate of fuel delivery may differ across fuel types. In order to achieve the same (or similar) AC electrical power output from the standby inverter generator 20, the controller 26 (or an actuator or display) may prompt a user to select a fuel source type. The selection can be made by moving or actuating a button or otherwise making a selection via a display that is in communication with the controller 26. Upon receiving a selection, the controller 26 can access a memory 170 (e.g., an on-board memory or cloud-based memory), which stores operational parameters associated with the selected fuel source. The controller 26 can then communicate with the fuel delivery system and spark plugs of the engine 22 to provide fuel and perform combustion at a frequency necessary to drive the crankshaft 42 and rotor 48 at an angular velocity sufficient to generate the desired electrical load.

Although shown as a singular unit, the standby inverter generator 20 can be included in series or in parallel with additional standby inverter generators 20 to increase the total power generation capacity for a building. For example, two 6.5 kW rated standby inverter generators can be positioned in parallel to increase the power delivery capability of the standby inverter generators 20. Each standby inverter generator 20 can be provided with its own controller 26 or, alternatively, a single controller 26 can control both units. In some examples, one standby inverter generator 20 includes a master controller 26 that can communicate with a slave controller on the one or more additional standby inverter units coupled together. In some examples, the standby inverter generator 20 is a 9.5 kW unit.

Figure 14:
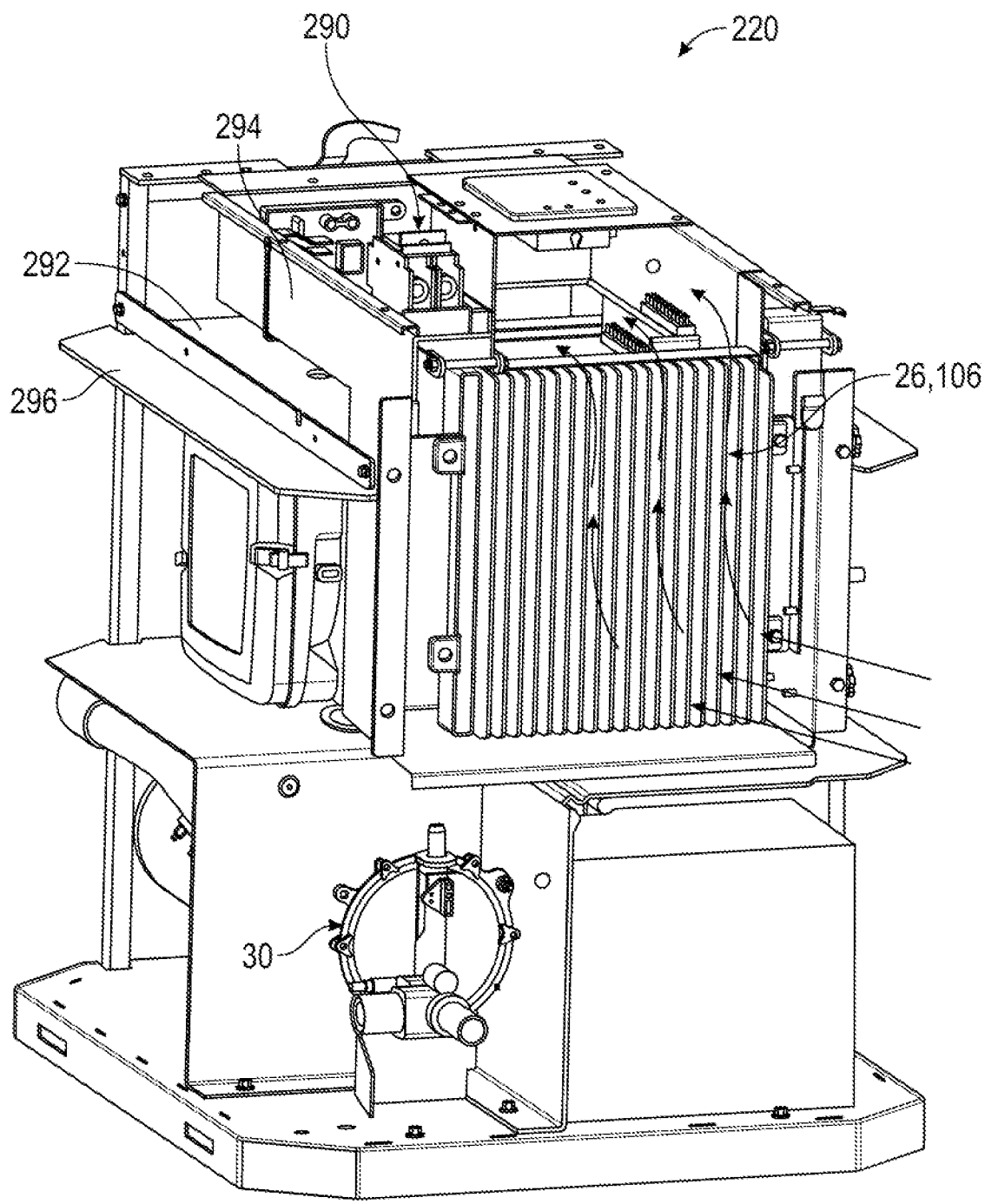
FIG. 14 is another perspective view of the standby generator of FIG. 13, detailing an inverter and other electronic components within the standby generator.

Referring now to FIGS. 12-18, another standby inverter generator 220 is depicted. The standby inverter generator 220, like the standby inverter generator 20, includes an internal combustion engine 22, an alternator assembly 24, a controller 26, and a muffler 28. The inverter generator 220 is positioned within and coupled to a standby housing 300, which is configured to be positioned alongside a home or building. As depicted in FIGS. 13-17, the inverter generator 220 is coupled to a floor panel 302 of the standby housing 300. A fuel connection 30 can be positioned near a perimeter of the floor panel 302, and can extend through the standby housing 300 to form a coupling with a fuel source, like compressed natural gas, propane, gasoline, or other suitable energy source. As depicted in FIG. 14, the fuel connection 30 can include a flow regulator to help meter the flow of fuel from a nearby fuel source (not shown) into the internal combustion engine 22. The controller 26 (which includes the inverter 106) extends at least partially above the internal combustion engine 22 and alternator assembly 24, and approximately parallel to an outer surface of the standby housing 300.

Figure 16:
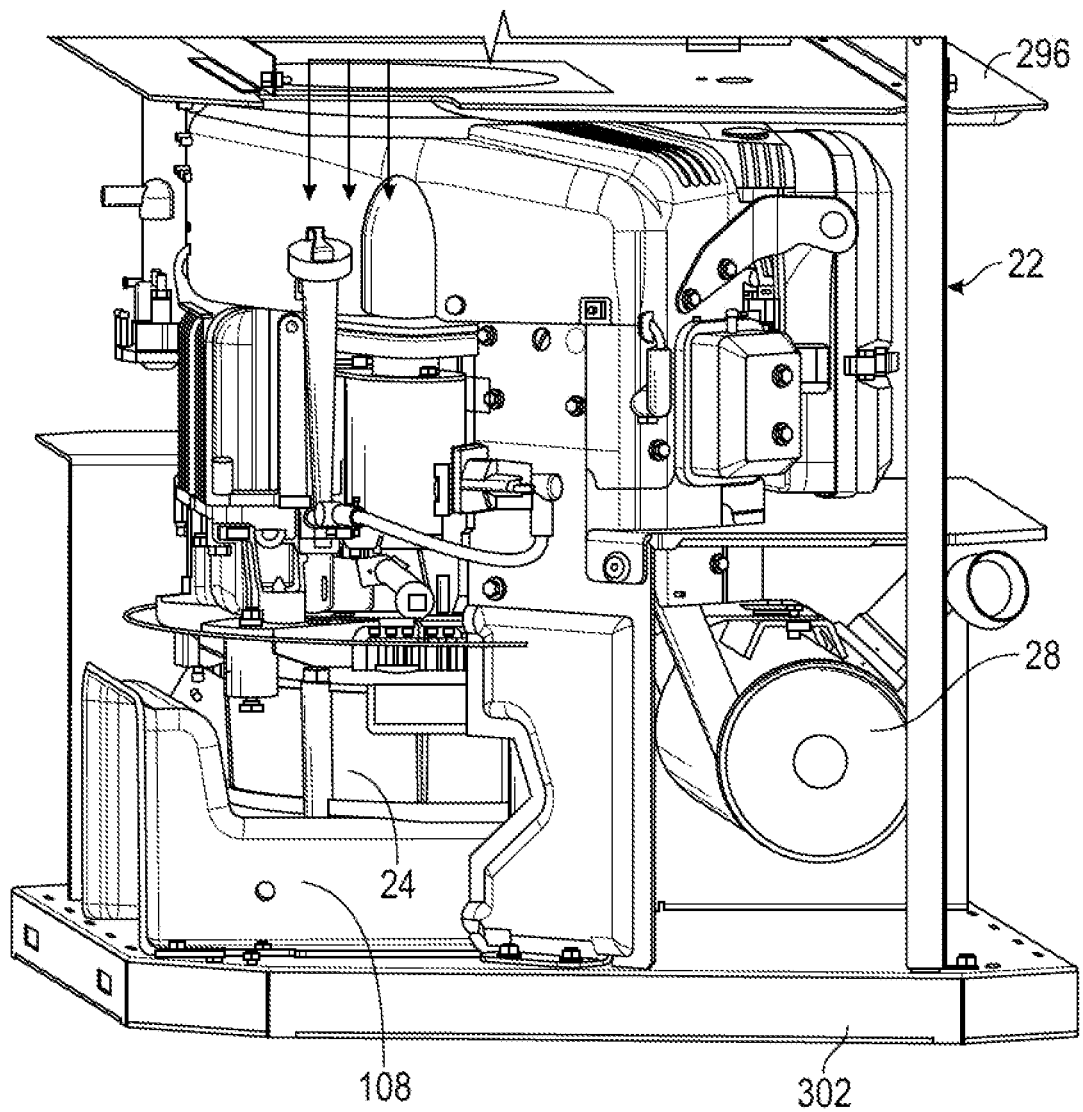
FIG. 16 is another perspective view of the standby generator of FIG. 13, detailing an engine and alternator used by the standby generator.
Figure 17:
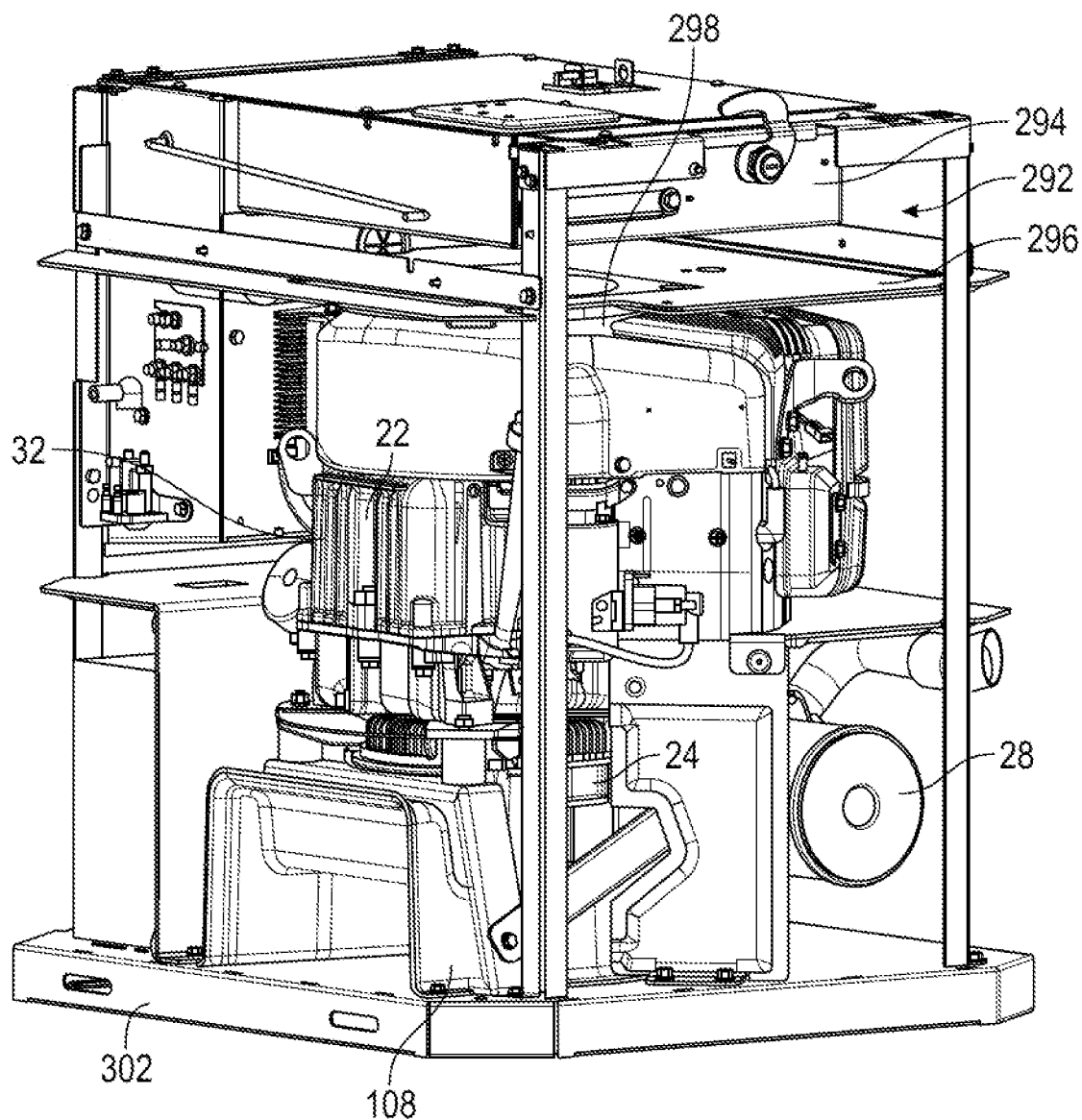
FIG. 17 is another perspective view of the standby generator of FIG. 13.

The standby inverter generator 220 has a compact design that reduces the overall footprint of the system relative to conventional generators. For example, and as depicted in FIG. 16, the alternator assembly 24 is defined by a height that is less than half a height defining the engine block 32. By reducing the height of the alternator assembly 24, the internal combustion engine 22 can be positioned lower to the floor panel 302, which can further promote cooling.

The standby inverter generator 220 and its associated standby housing 300 are designed to improve airflow and cooling of the various heat-generating components within the standby inverter generator 220. As depicted in FIGS. 13-17, the alternator assembly 24 and internal combustion engine 22 are each suspended off of the floor panel 302 to allow airflow beneath the components. Like the inverter generator 20, the inverter generator 220 also includes an alternator stand 108 that is configured to permit airflow beneath the alternator assembly 24. The internal combustion engine 22 is suspended away from the floor panel 302 by a frame, shown as support structure 280, that is formed of a combination of support bars 282 and one or more panels 284. The support bars 282 can be bent, welded, or otherwise formed into a shape that provides a support surface 286 that extends approximately parallel to the floor panel 302. The support surface 286 can include one or more bosses 288 that are used to mount the engine block 32 to the floor panel 302. In some examples, the one or more panels 284 can be formed to extend around the engine block 32 to serve as a heat shield between the muffler 28 and the internal combustion engine 22 and alternator assembly 24.

Figure 18:
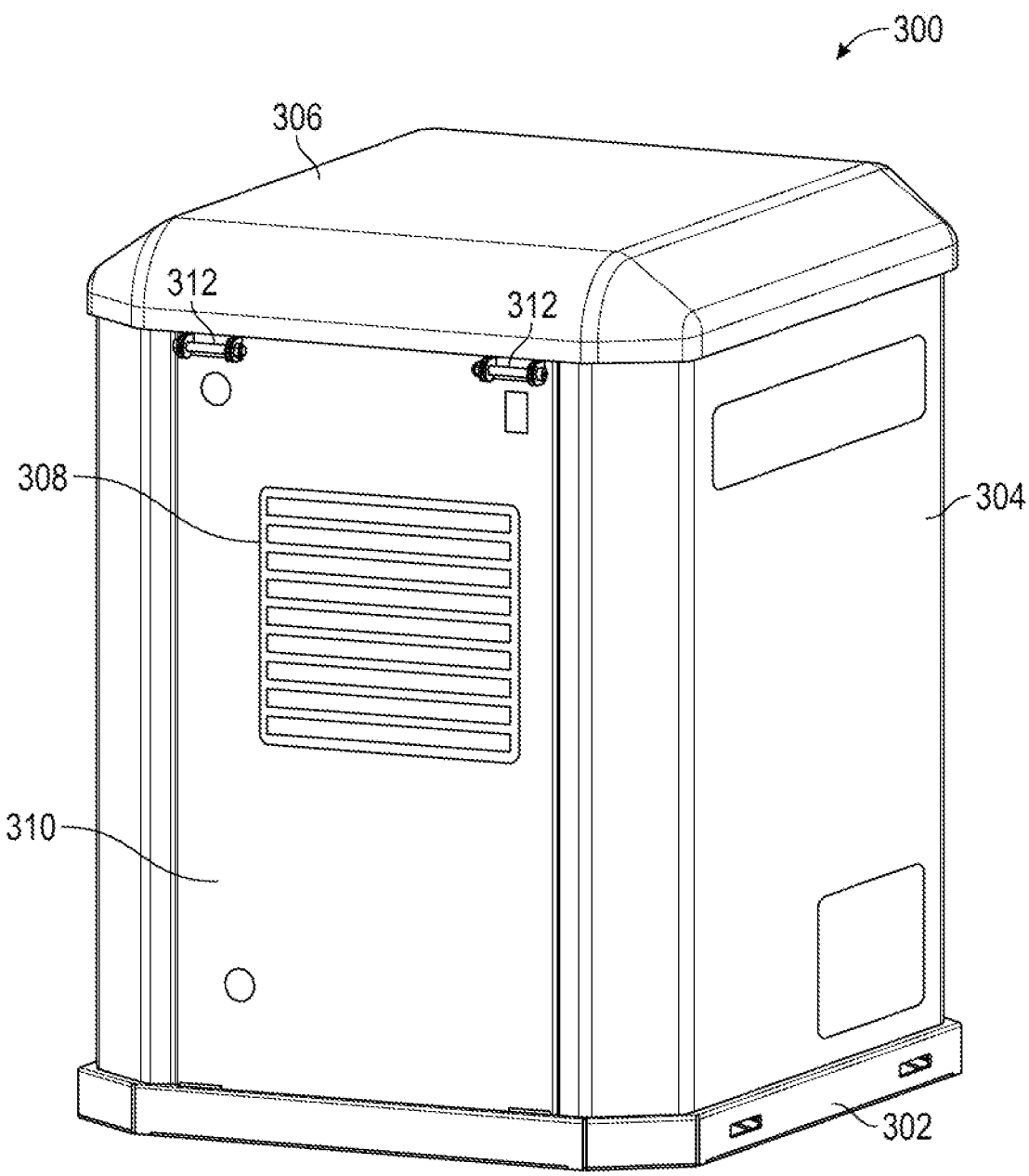
FIG. 18 is a perspective view of the standby housing of FIG. 12, depicting an access door to the inverter of FIG. 14.

The standby inverter generator 220 is designed to direct cooling air into and through the different heat generating components. As depicted in FIG. 18, the standby housing 300 is formed of panels 304 and a roof 306. The panels 304 extend away from the floor panel 302 and can support a series of vents, shown as grilles 308 that allow air to enter into the standby housing 300. In some examples, the grilles 308 include one or more louvered panels that are designed to filter out contaminants from cooling air prior to entering into the standby housing 300.

The primary air flow pattern through the standby housing 300 directs cooling air over the controller 26 and inverter 106 first, to the electrical panel 290, and then down into and toward the internal combustion engine 22 and out of the standby housing 300. As depicted in FIG. 14, air is first directed through a grille 308 formed in a panel 304 toward the controller 26 and inverter 106. The high electrical loading of these components generates a significant amount of heat that is advantageously removed from the system. By directing the primary airflow through the standby housing 300 toward the inverter 106 and controller 26 first, ambient air will contact the inverter 106 and controller 26 when the air is at its coolest temperature. Accordingly, air having the greatest capacity for cooling the system will be directed over the most heat-sensitive components first.

Figure 15:
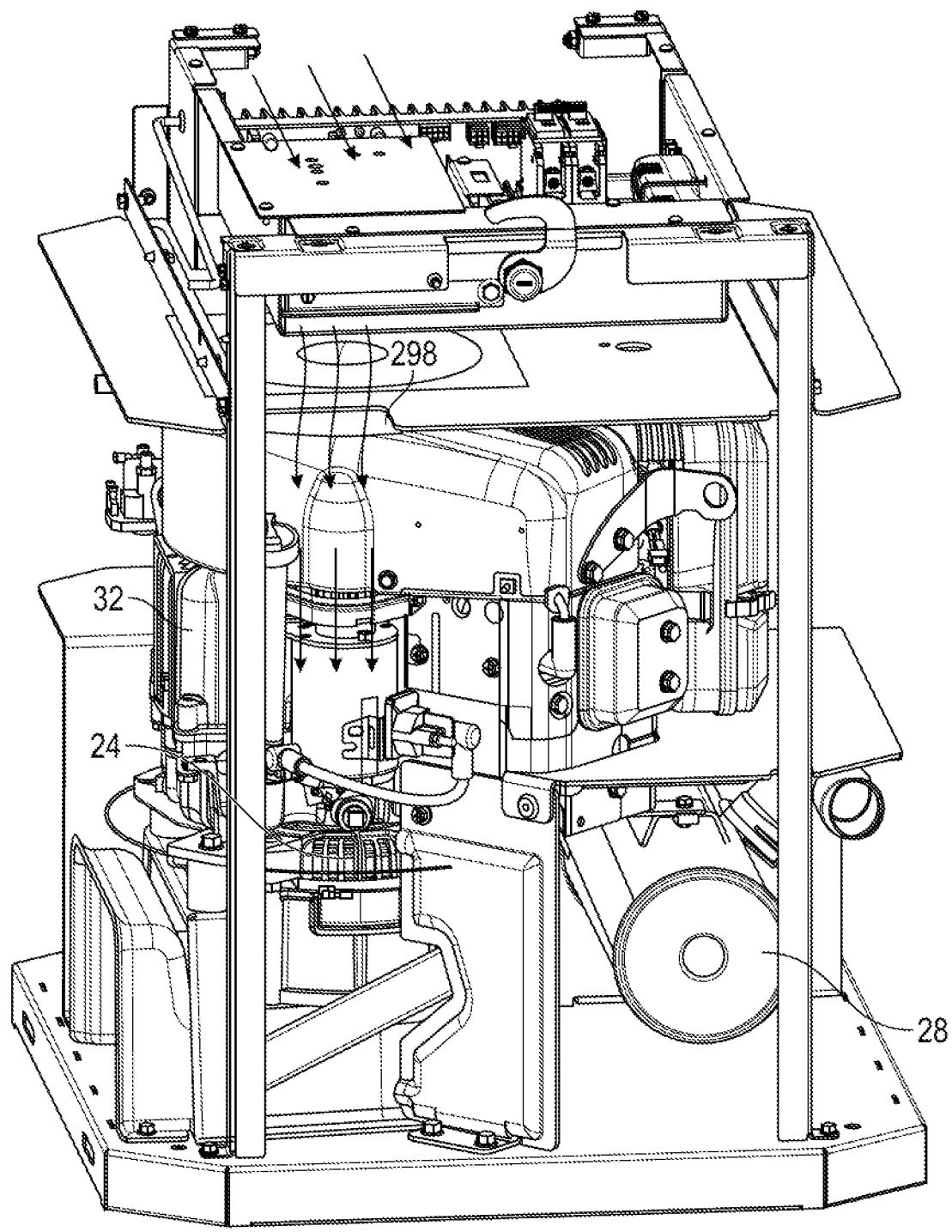
FIG. 15 is another perspective view of the standby generator of FIG. 13, detailing an airflow pattern through the standby generator.

The cooling air passes toward the inverter 106 and controller 26 and is heated as the air passes over these components. As the air warms and carries heat away from the inverter 106 and controller 26, the air rises within the standby housing 300. A passage is formed above the inverter 106 and controller 26 that directs this air toward the electrical panel 290 that extends above the internal combustion engine 22 and alternator assembly 24. As depicted in FIG. 15, the electrical panel 290 is suspended above the internal combustion engine 22 and separated from the internal combustion engine 22 by an air gap 292. The air gap 292 can be defined by a tray 294 that receives the electrical panel 290 and a heat shield 296 extending above the internal combustion engine 22. The tray 294 and the heat shield 296 can extend approximately parallel to one another and approximately parallel to the floor panel 302.

The heated air passes over electrical panel 290, toward a recess 298 formed within the tray 294 and through the heat shield 296, as depicted in FIG. 15. The heated air then travels downward, through the tray 294 and the heat shield 296, and to the internal combustion engine 22. The operation of the internal combustion engine 22 can create a low pressure area near the internal combustion engine 22 which urges the air downward. In some examples, a portion of the cooling air can be used by the internal combustion engine 22 to execute the combustion reaction to drive the engine 22. The remaining cooling air can pass along the exterior of the engine block 32 and the alternator assembly 24 to carry heat away from these components. Additional grilles 308 can be formed within the panels 304 to direct the cooling air outward from the standby housing 300, and back to the external environment. Using the primary cooling path, the most heat-sensitive heat generating components can be provided with external cooling air first, which can help to promote a more effective cooling process.

Referring now to FIG. 18, the standby housing 300 is configured to provide easy access to the various electrical components of the standby inverter generator 220. In some examples, the roof 306 is designed to be removable from the rest of the enclosure. In addition to the roof 306 being removable, one or more of the panels 304 can be designed to provide access into the inverter 106 and/or controller 26. For example, the panel 310 extending in front of the inverter 106 and controller 26 can be rotatably coupled to the rest of the standby housing 300. The panel 310 can be supported by hinge joints 312 that allow the panel 310 to rotate relative to the roof 306 or relative to the other panels 304, to a position that permits access to the inverter 106 and controller 26 positioned nearby.

Using the aforementioned controller 26, the engine 22 can be controlled to accommodate varying electrical power loads in a manner that avoids excess fuel consumption or unused power. By controlling the engine speed to mirror (or slightly overshoot) the required power output, the engine can run at lower speeds when appropriate, which reduces the amount of noise and fuel emissions outputted by the standby inverter generator. By further controlling the engine to fire only one of two cylinders 34 in certain situations, the emissions and noise can be further limited. Significant efficiency gains result from the low power exercise mode carried out by the controller 26 and engine 22. The engine 22 and controller 26 also enable the standby inverter generator to operate on multiple different fuel sources effectively.

Various other advantages are achieved by the standby inverter generator 20 disclosed. The alternator assembly 24 has a high frequency output, which allows the overall standby inverter generator to be shorter (e.g., by about 6 inches). The height reduction in turn allows the inverter 106 and associated controller 26 to be positioned above the engine 22, in a position where it is easier to access and more directly within the flow path of cooling air from multiple directions. The inverter 106 can provide clean AC electrical power at different frequencies to accommodate different loading. Similarly, the vertical orientation of the crankshaft 42 reduces the horizontal footprint of the standby inverter generator 20, allowing for smaller standby housings 100 to be used. In some examples, the floor panel 102 is reinforced to allow the standby housing 100 and standby inverter generator 20 to be moved using a standard dolly.

Referring now to FIGS. 19-22 and 23, another exemplary embodiment of a standby inverter generator 420 is depicted. The standby inverter generator 420 may be substantially similar to the standby inverter generator 2 except as described herein. For example, the standby inverter generator 420 includes an internal combustion engine 422, an alternator assembly 424, a controller 426, an intake manifold 430, and a muffler 428. In some embodiments, the controller 426 may be within the alternator housing 423 of the alternator assembly 424 and not visible. The inverter generator 420 is positioned within and coupled to a standby housing 500, which is configured to be positioned alongside a home or building. The inverter generator 420 sits on a frame 510 that is coupled to a floor panel 502 of the standby housing 500. The frame 510 is configured to couple the internal combustion engine 422 to the floor panel 502 and to separate each of the other components of the standby inverter generator 420. The side walls and upper panel of the standby housing 500 are not shown. A fuel connection can be positioned near a perimeter of the floor panel 502, and can extend through the standby housing 500 to form a coupling with a fuel source, like compressed natural gas, propane, gasoline, or other suitable energy source. In other embodiments, the fuel connection can be positioned in other locations.

Figure 20:
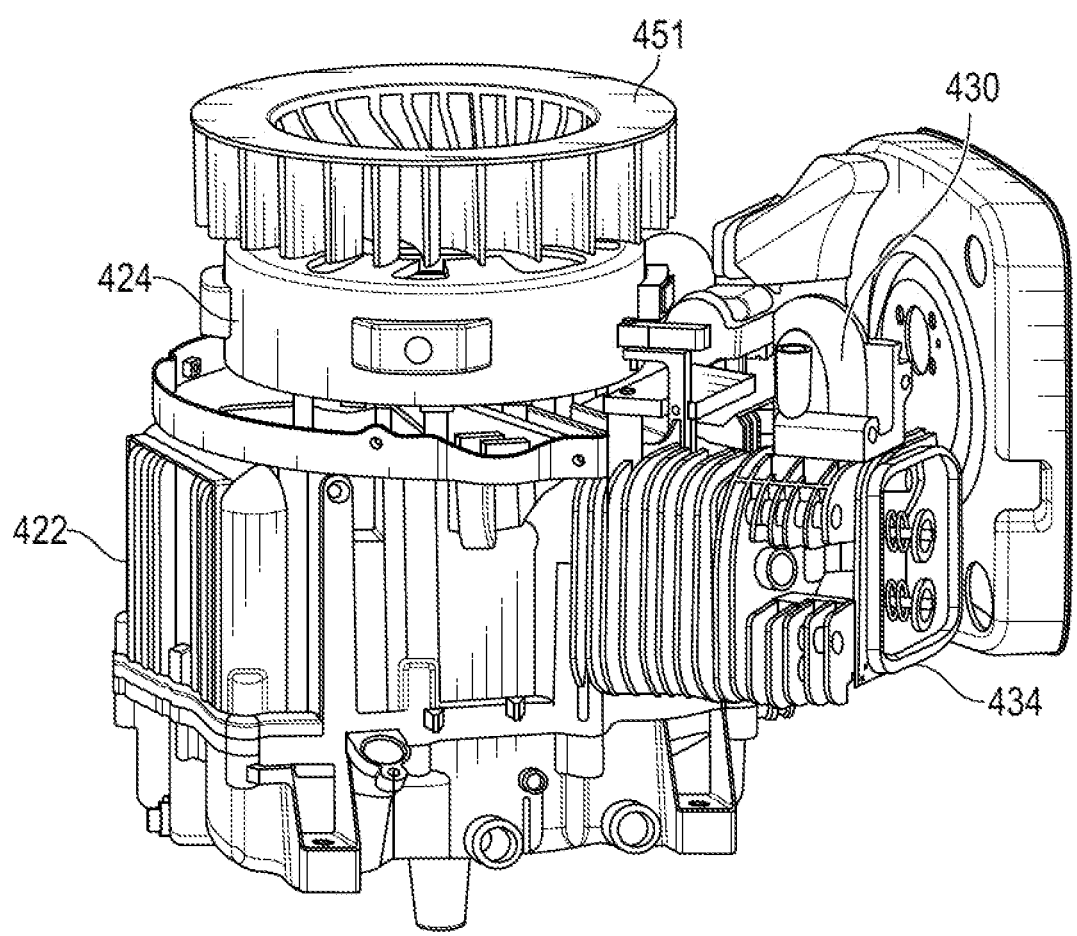
FIG. 20 is a perspective view of an internal combustion engine and alternator assembly of the standby generator of FIG. 19.
Figure 21:
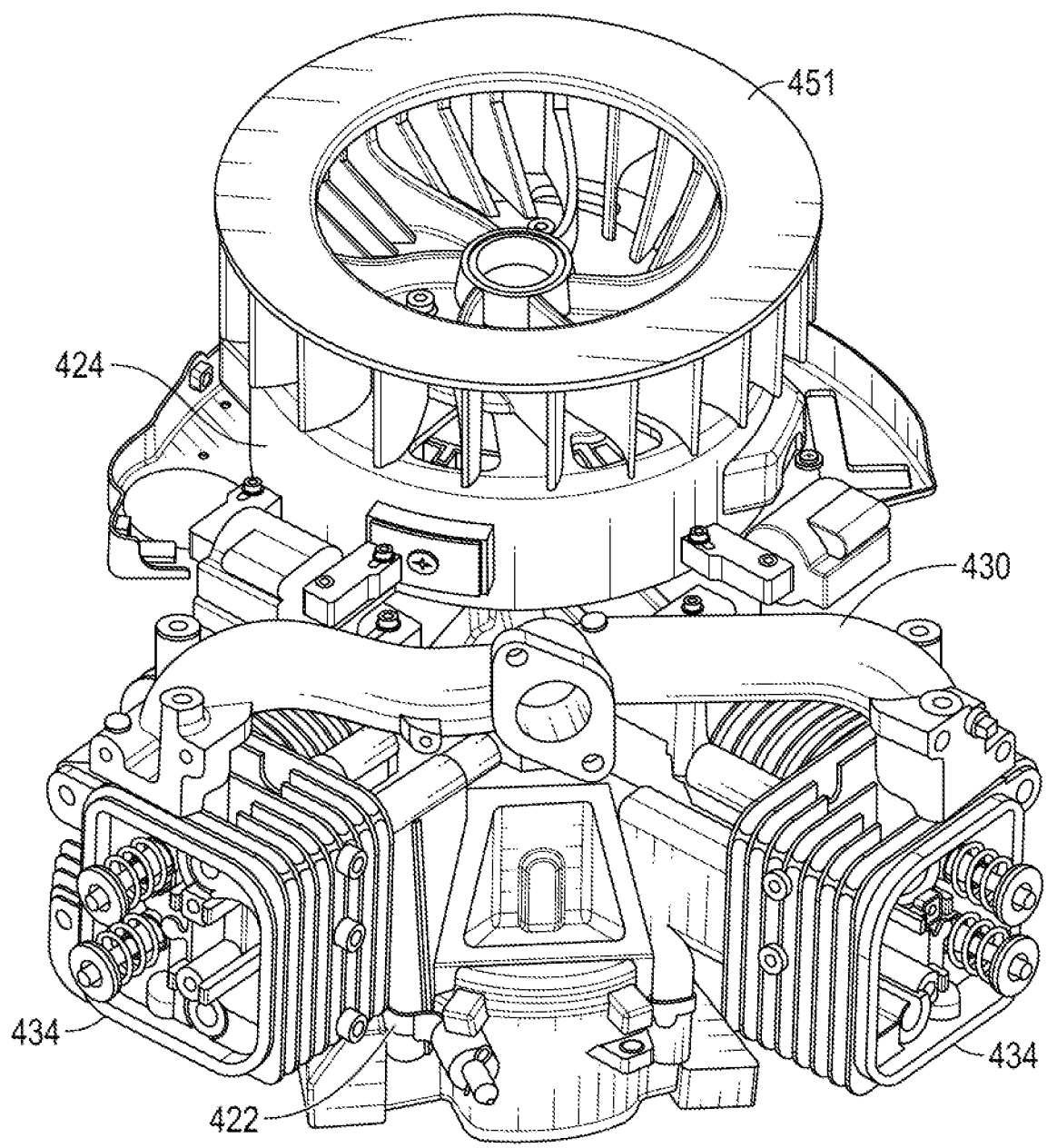
FIG. 21 is a perspective view of an internal combustion engine and alternator assembly of the standby generator of FIG. 19.
Figure 22:
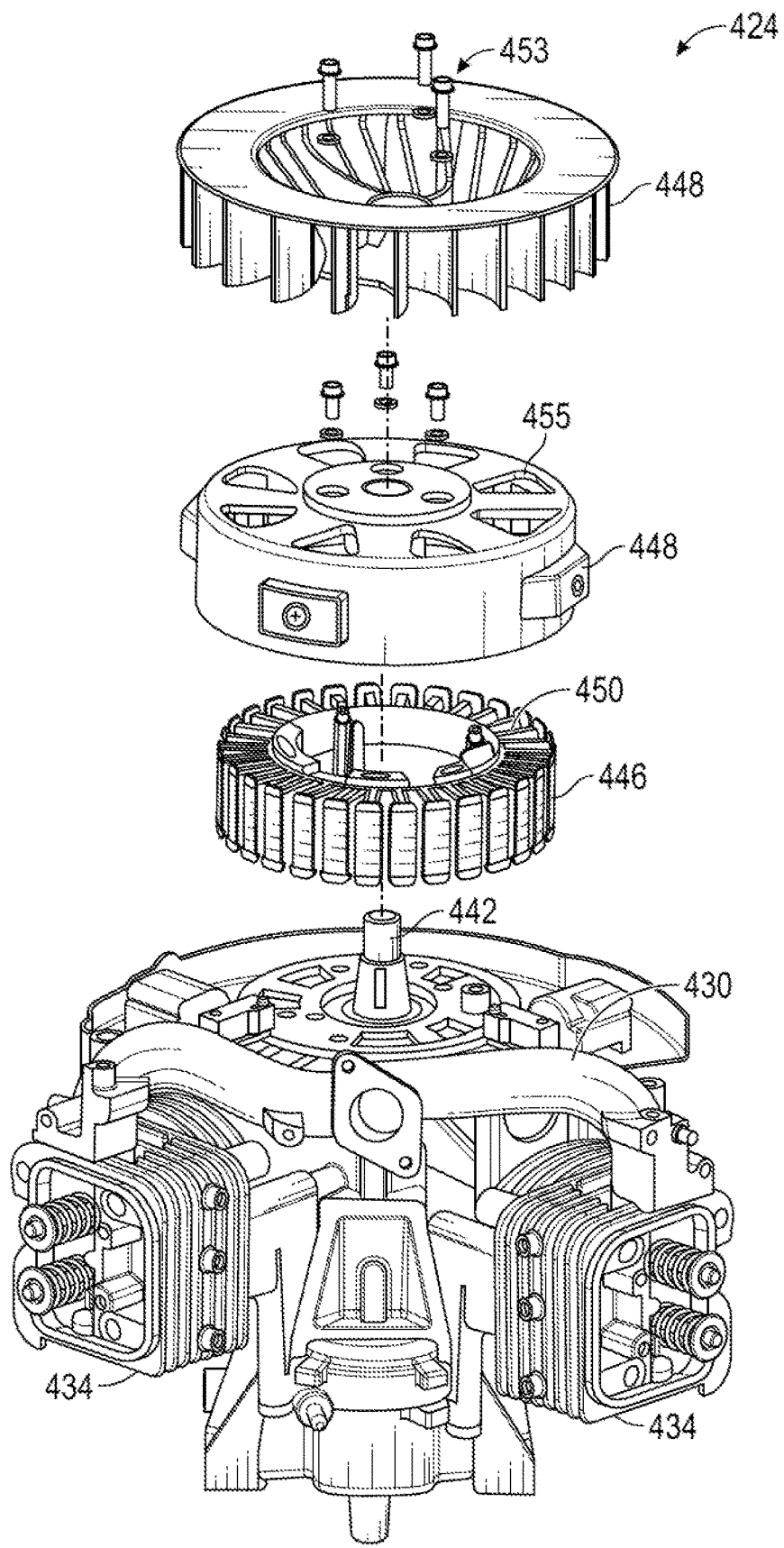
FIG. 22 is an exploded perspective view of an internal combustion engine and alternator assembly of the standby generator of FIG. 19.

FIGS. 20 and 21 are perspective views of the internal combustion engine 422 and the alternator assembly 424 of the standby inverter generator 420 in different orientations. FIG. 22 shows an exploded perspective view of the internal combustion engine 422 and alternator assembly 424 in the orientation shown in FIG. 21. The alternator housing 423 is not shown in FIGS. 20, 21, and 22. The alternator assembly 424 of the standby inverter generator 420 is positioned above and is coupled to the internal combustion engine 422. Referring now to FIG. 22, the alternator assembly 424 includes a stator 446 and a rotor 448. The crankshaft 442 of the internal combustion engine 422 extends through the stator 446 and is coupled to the rotor. As described above, the rotor 448 rotates with the crankshaft 442 and the rotating rotor magnets generate a magnetic flux that induces an electrical current in the coils 450 of the stator 446, generating alternating current electrical power. The alternating current electrical power is directed to the controller 426, which includes a rectifier 504 and an inverter 506, for selectively converting the alternating current electrical power into direct current electrical power and back to stable alternating current electrical power.

The alternator assembly 424 includes a fan 451 positioned above and coupled to the rotor 448, e.g., via a plurality of fasteners 453. The fan 451 pulls in air from above the standby inverter generator 420 and pushes it down through the alternator assembly 424 to an air intake of the internal combustion engine 422. The rotor 448 may include a plurality of openings 455 configured to allow air to pass through the rotor 448 to the internal combustion engine 422. At least a portion of the air is used in the combustion of fuel in the cylinders 434 internal combustion engine 422. The air moved through the alternator assembly 424 by the fan 451 also acts to cool the alternator assembly 424 and the internal combustion engine 422 without the need for additional fans, blowers, or ducting. Exhaust from the cylinders 434 is directed to the muffler 428, which reduces the sound generated by the internal combustion engine 422. The muffler 428 is positioned below the internal combustion engine 422. Air flow generated by the fan 451 may also cool the muffler 428.

In some embodiments, the alternator assembly 424 may be operated as a starter motor to provide the initial rotation of the crankshaft 442 required to start the engine 422. The coils 450 in the stator 446 of the alternator assembly 424 draw power from a battery (not shown), generating an electromagnetic field. The electromagnetic field causes the rotor 448 of the alternator assembly 424 to rotate. Thus, the alternator assembly 424 essentially operates in reverse to generate rotation of the rotor 448 using electricity, rather than generating electricity from the rotation of the rotor 448 by the internal combustion engine 422. Because the rotor 448 is coupled to the crankshaft 442, the crankshaft 442 rotates with the rotor 448, which causes the pistons of the cylinders 434 to reciprocate. The internal combustion engine 422 can then begin operate as described above, by igniting an air and fuel mixture in the cylinders 434 using spark plugs to fire the pistons and rotate the crankshaft 442. The alternator assembly 424 can then stop operating as a starter motor and begin to operate as an alternator to generate electricity from the rotation of the crankshaft 442 by the engine 422 following a set period of time, in response to threshold engine speed, and/or in response to another indication the engine 422 has been started.

The controller 426 (shown in FIG. 19) can be configured to control the rotational speed of the rotor 448 when starting the engine 422. As discussed above with reference to the generator 20, during operation of the generator 420, the controller 426 can be configured to control the speed of the engine 422 to match the required power demand (e.g., the electrical load) on the generator 420. The controller 426 can similarly be configured to control the starting speed of the rotor 448 and thus the crankshaft 442 during startup so that the engine speed can immediately match the power demand when the generator 420 starts. This allows for a more seamless transition from grid power to generator power and can reduce noise at startup compared to using startup speed set to a maximum speed. As described above with respect to the controller 26, the controller 426 also comprises a rectifier 504 and an inverter 506 respectively configured to convert the AC power from the generator 20 to DC power, and back to a cleaner (e.g., higher quality) and more widely useful AC electrical power at a desired frequency and voltage (e.g., 120 VAC at 60 Hz).

The controller 426 can also be configured to control the spark generation timing of the spark plug (not shown). For example, the controller 426 can be configured to delay the spark plug timing at slower speeds such that the cylinders 434 fire near top dead center. At higher speeds, the controller 426 can be configured to fire earlier than when the cylinders 434 are at top dead center. This allows for more efficient use of fuel and operation of the engine 422. The controller 426 can be electrically coupled to the spark plugs and can send electricity to the spark plug to generate a spark. Because the rotor 448 is coupled to the crankshaft 442, the position of the rotor 448 can be used to determine the position of the pistons. For example, the alternator assembly 424 may include a rotor position sensor that is communicatively coupled to the controller 426 and configured to detect the position of the rotor 448. The controller 426 may receive rotor position data from the rotor position sensor and may use the rotor position data to determine when to fire the spark plugs. When starting the internal combustion engine 422, the controller 426 may control the spark generation timing of the spark plug based on the starting speed determined as described above.

Figure 19:
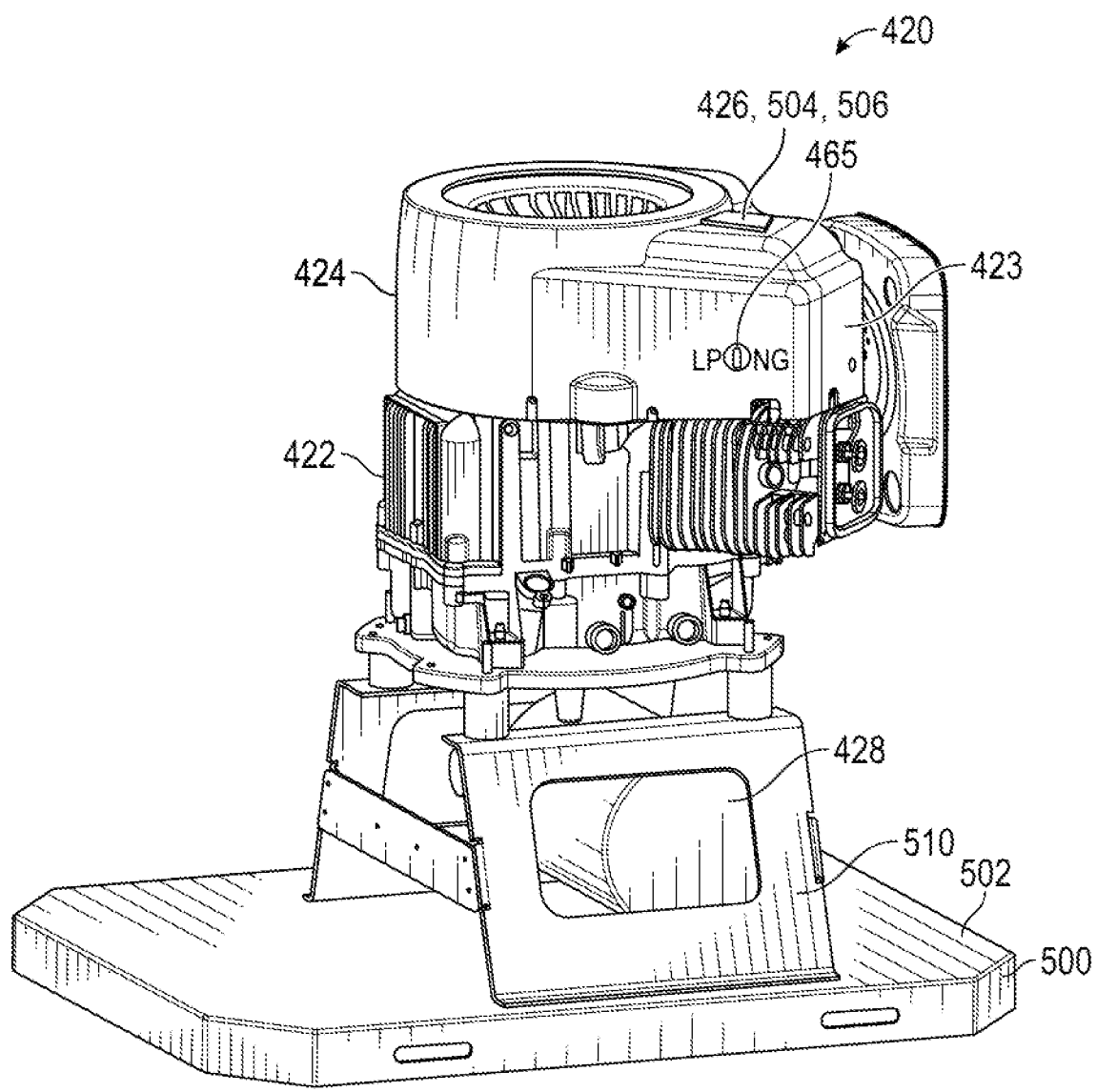
FIG. 19 is a perspective view of a standby generator, according to an exemplary embodiment.
Figure 24:
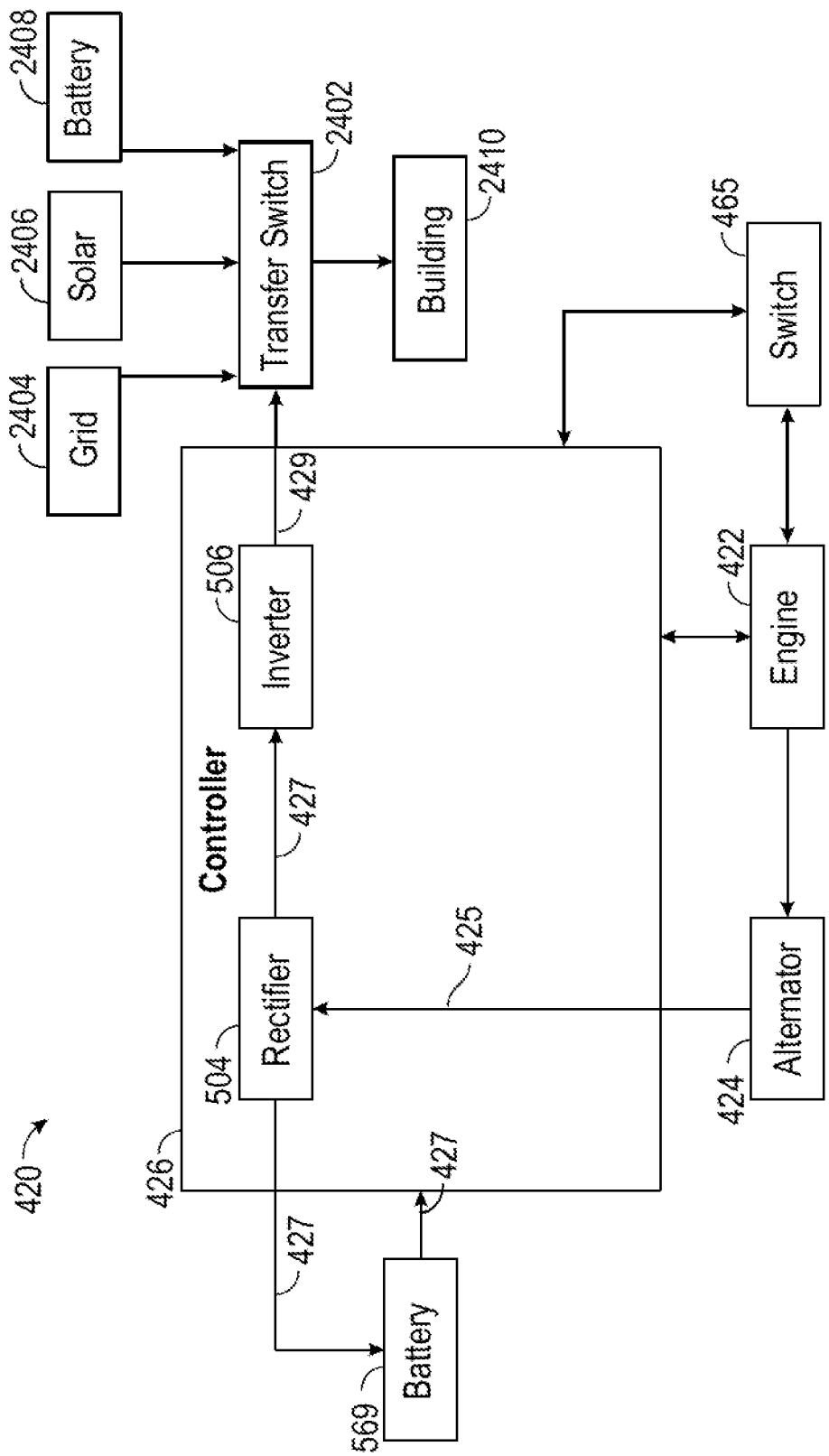
FIG. 24 is a schematic view of the standby generator of FIG. 19.

The spark plug firing timing can also be adjusted based on fuel type. For example, the generator 420 may be configured to run on both liquefied petroleum (LP) and natural gas (NG). Because these fuels may burn and expand at different rates, the timing of spark plug firings needs to be adjusted to ensure efficient operation of the engine 422. As shown in FIG. 19, the generator 420 may include a switch 465 (e.g., rocker switch, knob, button, etc.) that allows a user to input whether the fuel used is LP, NG or some other fuel (e.g., gasoline). FIG. 24 is a schematic view of the standby inverter generator 420, including the switch 465. The controller 426 may receive a signal from the switch 465 and may adjust the timing of the spark plug firings based on the signal received. In some embodiments, the switch 465 may also enable the flow of one type of fuel while disabling the flow of another type of fuel. For example, moving the switch 465 to the NG position may open a first valve that allows NG from an NG supply to flow into the cylinders 434 and may close a second valve, stopping LP from flowing into the cylinders 434. Moving the switch 465 may physically open and close the valves or may send an electrical signal causing the valves to open and close. The switch 465 may be positioned on the alternator housing 423, on a fuel line remote from the generator 420, or elsewhere in the generator 420. As discussed above, moving the switch 465 may act to both determine the fuel type allowed to reach the cylinders 434 and send an indication of the selected fuel type to the controller 426. Fuel flow into the cylinders 434 may be governed by a regulator and/or an electronic fuel injector. As described above, the alternator 424 generates AC power 425, which is directed the rectifier 504 within controller 426. The rectifier 504 generates DC power 427. The DC power 427 is directed to the inverter, which converts the DC power from the rectifier 504 to stable AC power 429 suitable for use in a home or other building. Some of the DC power 427 may be directed to a battery 569 for later use.

In some embodiments, the generator 420 may include a sensor configured to detect the type of fuel being delivered to the engine 422. For example, the sensor may be a chemical sensor configured to detect levels of certain components of the fuel. The controller 426 may be communicatively coupled to the sensor and configured to receive a signal from the sensor indicating the fuel type. The controller 426 can adjust the timing of the spark plug firings based on the signal received from the sensor. In other embodiments, the fuel type may be input via a digital user control panel.

Referring still to FIG. 24, in some embodiments, the inverter 506 delivers the stable AC power 429 to a transfer switch 2402. The transfer switch 2402 may also be configured to receive power from the electrical grid 2404, a solar panel system 2406, and a battery 2408. The transfer switch 2402 is configured to switch between the various power sources to supply power to the building 2410. For example, if grid power 2404 fails (e.g., during a blackout) and no power is available from the solar panels 2406 (e.g., at night), the transfer switch may supply power form the battery 2408 and/or the standby inverter generator 420 to the building 2410. In some embodiments, the transfer switch 2402 may be configured to allow the standby inverter generator 422, the grid power 2404, and/or the solar panels 2406 to charge the battery 2408. In some embodiments, the transfer switch 2402 may be referred to as a component of the inverter generator 422. In some embodiments, the transfer switch 2402 is configured to be attached to a building 2410 and is attached to the building 2410 when the standby inverter generator 420 is installed on site. For example, the transfer switch 2402 may be attached to a wall of the building 2410 near the building's circuit breaker panel.

Figure 25:
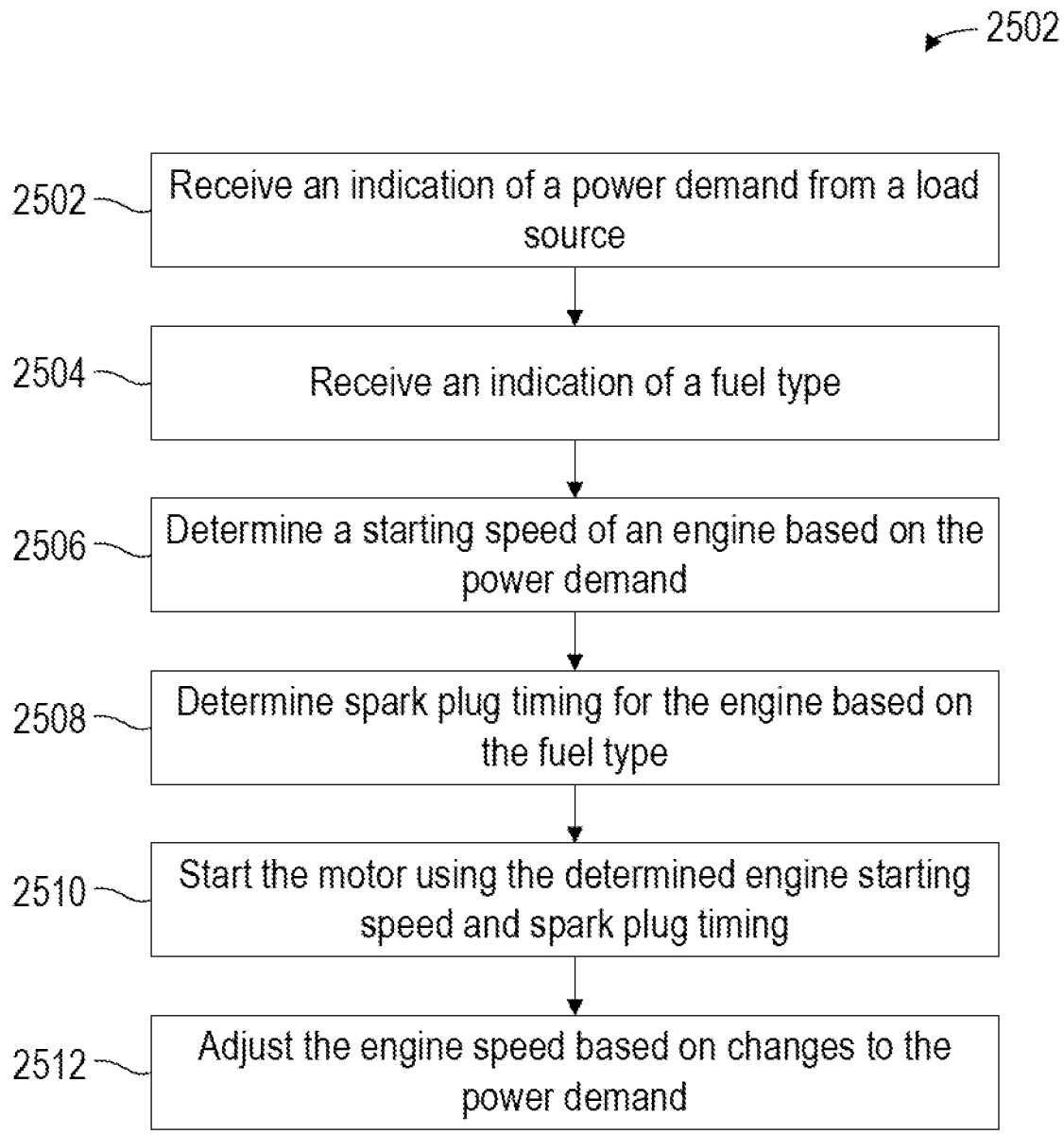
FIG. 25 is a flow diagram of a method of operating a standby inverter generator.

FIG. 25 illustrates a method 2500 of controlling a standby inverter generator (e.g., standby inverter generator 420). The method may be performed, for example, by controller 426. At operation 2502 of method 2500, an indication of a power demand form a load source is received. For example, the controller 426 may receive an indication of a power demand from a building. The indication may also signal the controller 426 to start the internal combustion engine 422. At operation 2504 of method 2500, an indication of a fuel type is received. For example, the controller 426 may receive an indication of a fuel type from the switch 465 or from a fuel type sensor. At operation 2506 of method 2500, a starting speed of the engine is determined based on the power demand. For example, the controller 426 may control the starting speed of the engine 422 such that the standby inverter generator 420 produces the appropriate amount of power to meet the power demand of the building. At operation 2508 of method 2500, spark plug timing for the engine is determined based on the fuel type. For example, as described above, the controller 426 may determine the spark plug timing based on whether the fuel source is LP, NG, or gasoline. At operation 2510 of method 2500, the motor is started using the determined engine starting speed and spark plug timing. For example, the controller 426 may start the internal combustion engine 422 using the determined starting speed and spark plug timing. Once started, the engine 422 can continue to run using the determined starting speed and spark plug timing. At operation 2512 of method 2500, the engine speed is adjusted based on changed to the power demand. For example, when the load on the building increases or decreases, the controller 426 can adjust the engine speed to such that the standby inverter generator 420 produces the appropriate amount of power to meet the new power demand.

Figure 23:
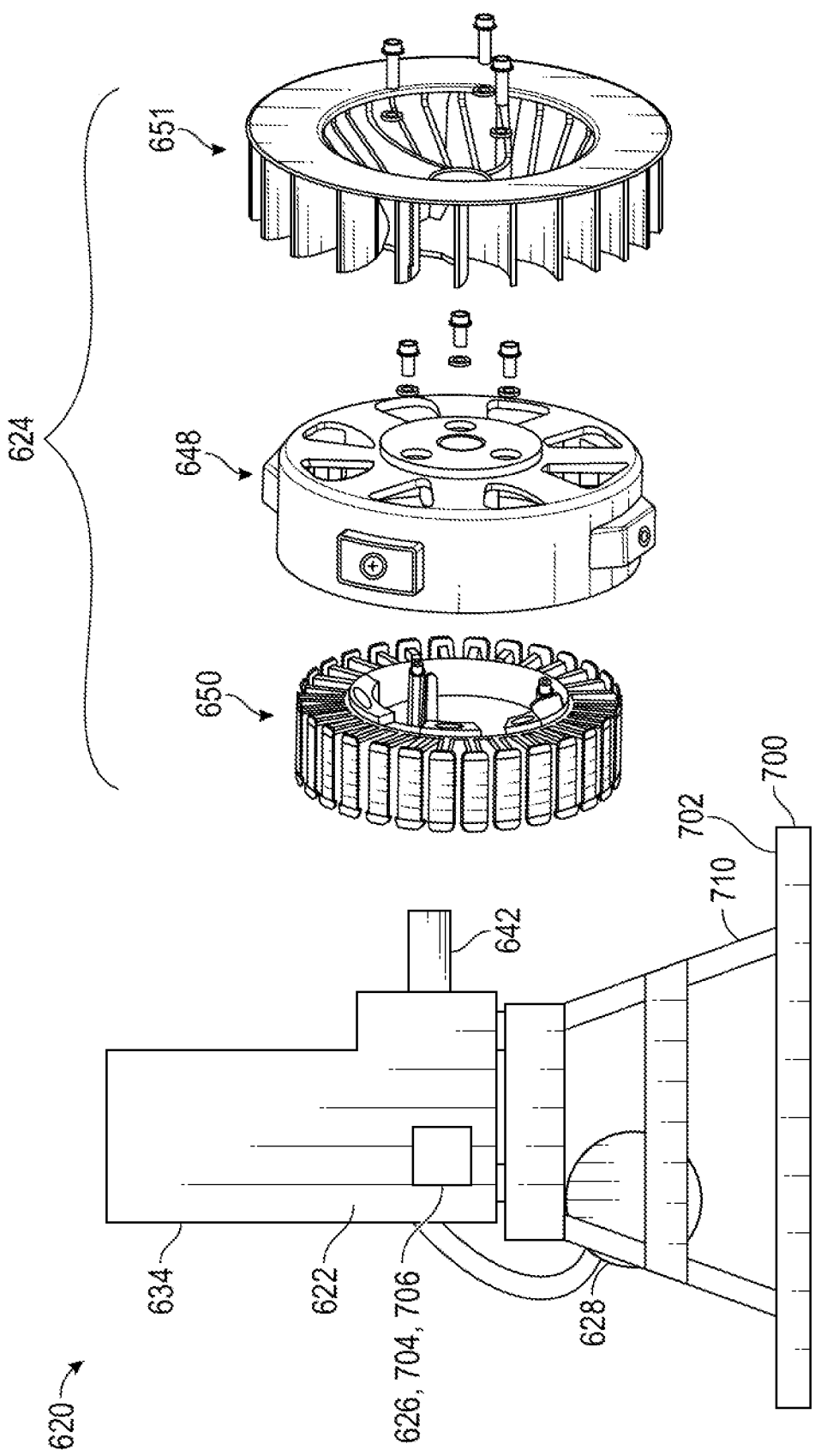
FIG. 23 is a partially exploded view of a standby generator, according to an exemplary embodiment.

Referring now to FIG. 23, another exemplary embodiment of a standby inverter generator 620 is depicted. The standby inverter generator 620 includes an internal combustion engine 622. The internal combustion engine 622 is a single cylinder, horizontal shaft engine. In other embodiments of a standby inverter generator, the internal combustion engine may be a multiple cylinder horizontal shaft engine, for example, a v-twin horizontal shaft engine. In still other embodiments of a standby inverter generator, the internal combustion engine may be a single cylinder vertical shaft engine. The internal combustion engine includes a single cylinder 634 and a crankshaft 642. The standby inverter generator 620 is positioned within and coupled to a standby housing 700, which is configured to be positioned alongside a home or building. The standby inverter generator 620 sits on a frame 710 that is coupled to a floor panel 702 of the standby housing 700. The frame is configured to couple the internal combustion engine 622 to the floor panel 702 and to separate each of the other components of the standby inverter generator 620. The side walls and upper panel of the standby housing 700 are not shown. However, the standby housing 700 may be substantially similar to the standby housing 100 shown in FIGS. 11 and 12. A fuel connection can be positioned near a perimeter of the floor panel 702, and can extend through the standby housing 700 to form a coupling with a fuel source, like compressed natural gas, propane, gasoline, or other suitable energy source. A muffler 628 is coupled to the frame 710 under the internal combustion engine 622. In other embodiments, the muffler 628 may be positioned next to the internal combustion engine 622, e.g., on the opposite side of the crankshaft 642. The standby housing 700 is similar to and can include the same components as the standby housings 100 and 300.

Like the standby inverter generator 420, the standby inverter generator 620 includes an alternator assembly 624, including a stator 646 and a rotor 648. The crankshaft 642 of the internal combustion engine 622 extends through the stator 646 and is coupled to the rotor 648. As described above, the rotor 648 rotates with the crankshaft 642 and the rotating rotor magnets generate a magnetic flux that induces an electrical current in the coils 650 of the stator 646, generating alternating current electrical power. The standby inverter generator 620 includes a controller 626 configured to control the standby inverter generator similarly to the controller 626 of standby inverter generator 420. For example, the controller 626 includes a rectifier 704 and an inverter 706 to convert the alternating current output by the alternator assembly 624 to a clean alternating current. The controller 626 is also configured to control spark plug timing, control the speed of the engine 622 in response to a detected electrical load, and to control the rotor 648 speed when the alternator assembly 624 is used to start the engine, as discussed above with respect to controller 26 and controller 426.

The alternator assembly 624 also includes a fan 651 coupled to the rotor 648. The fan 651 is configured to pull in air from next to the standby inverter generator and push the air through the alternator assembly 624 to the internal combustion engine 622. The engine 622 may draw in a portion of the air to be used in the combustion of fuel in the cylinder 634 internal combustion engine 622. The airflow from the fan 651 may also cool the alternator assembly 624, engine 622, and muffler 628.

Although this description may discuss a specific order of method steps, the order of the steps may differ from what is outlined. Also, two or more steps may be performed concurrently or with partial concurrence or certain method steps may not be performed. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

The construction and arrangement of the standby inverter generator as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A standby generator comprising:
a standby housing defining a cavity;
an internal combustion engine comprising:
an engine block including a cylinder comprising a piston;
an engine housing at least partially covering the engine block; and
a crankshaft configured to rotate about a vertical crankshaft axis in response to movement by the piston;
an alternator comprising a rotor and a stator, the rotor configured to rotate with the rotation of the crankshaft to generate alternating current electrical power;
a fan positioned above and coupled to the rotor;
a controller comprising a rectifier configured to convert the alternating current to a direct current and an inverter configured to convert the direct current to a clean alternating current electrical power;
a transfer switch configured to receive the clean alternating current electrical power from the controller and at least one of grid power from an electrical grid, solar power from a solar panel assembly, or battery power from a battery, and configured to supply power to an electrical load; and
a switch configured to selectively enable the flow of a first type of fuel into the cylinder and disable the flow of a second type of fuel, wherein the switch is communicatively coupled to the controller and wherein the controller is configured to receive an indication of a fuel type based on a position of the switch,
wherein the internal combustion engine, the alternator, and the controller are positioned within the cavity of the standby housing for protection from the external environment.

2. The standby generator of claim 1, wherein the alternator is positioned above and coupled to the internal combustion engine, and wherein the fan is configured to draw in air from above the standby generator and move the air through the alternator to the internal combustion engine.

3. The standby generator of claim 2, wherein the internal combustion engine is configured to utilize at least a portion of the air drawn in by the fan.

4. The standby generator of claim 3, further comprising a muffler positioned below the internal combustion engine.

5. The standby generator of claim 4, wherein the standby housing includes a floor panel, a plurality of side panels, each extending upwardly away from the floor panel, and a cover, wherein the floor panel, side panels, and cover define the cavity.

6. The standby generator of claim 5, further comprising a frame configured to couple the internal combustion engine to the floor panel and to separate the alternator, the controller, the fan, and the muffler from the floor panel.

7. The standby generator of claim 1, wherein the switch is configured to selectively enable the flow of the first type of fuel into the cylinder by physically opening a first valve and to selectively disable the flow of the second type of fuel by physically closing a second valve.

8. A standby generator comprising:
a standby housing defining a cavity;
an internal combustion engine comprising:
an engine block including a cylinder comprising a piston;
an engine housing at least partially covering the engine block;
a crankshaft configured to rotate about a vertical crankshaft axis in response to movement by the piston; and
a spark plug configured to periodically generate a spark to ignite fuel in the cylinder to control the movement of the piston;

an alternator positioned within an alternator housing and comprising a rotor and a stator, the rotor configured to rotate with the rotation of the crankshaft to generate alternating current electrical power; and a controller positioned within the alternator housing and including a rectifier configured to convert the alternating current to a direct current and an inverter configured to convert the direct current to a clean alternating current electrical power;

a transfer switch configured to receive the clean alternating current electrical power from the controller and at least one of grid power from an electrical grid, solar power from a solar panel assembly, or battery power from a battery, and configured to supply power to an electrical load wherein the controller is configured to:
control spark generation timing of the spark plug;
receive an indication of a fuel type; and
adjust the spark generation timing of the spark plug based on the indication of a fuel type, and wherein the internal combustion engine, the alternator, and the controller are positioned within the cavity of the standby housing for protection from the external environment.

9. The standby generator of claim 8, wherein the fuel type comprises one of liquefied petroleum or natural gas.

10. The standby generator of claim 8, further comprising a switch configured to selectively enable the flow of a first type of fuel into the cylinder and disable the flow of a second type of fuel.

11. The standby generator of claim 10, wherein the switch is configured to generate the indication of the fuel type.

12. The standby generator of claim 8, further comprising a sensor configured to detect the fuel type and generate the indication based on the detected fuel type.

13. The standby generator of claim 8, wherein the alternator comprises a rotor position sensor communicatively coupled to the controller and configured to detect a rotational position of the rotor, and wherein the controller is configured to receive rotor position data from the rotor position sensor and adjust the spark generation timing of the spark plug based on the rotor position data.

14. A standby generator comprising:
a standby housing defining a cavity;
an internal combustion engine comprising:
an engine block including a cylinder comprising a piston;
an engine housing at least partially covering the engine block;
a crankshaft configured to rotate about a vertical crankshaft axis in response to movement by the piston; and
a spark plug configured to periodically generate a spark to ignite fuel in the cylinder to control the movement of the piston;

an alternator comprising a rotor and a stator, the rotor configured to rotate with the rotation of the crankshaft to generate alternating current electrical power;
a battery configured to supply power to the alternator; and
a controller including a rectifier configured to convert the alternating current to a direct current and an inverter configured to convert the direct current to a clean alternating current electrical power;
wherein the rotor is further configured to rotate the crankshaft using power from the battery to start the internal combustion engine,
wherein the controller is configured to detect an electrical load and wherein the starting speed is determined based on the detected electrical load, and
wherein the internal combustion engine, the alternator, and the controller are positioned within the cavity of the standby housing for protection from the external environment.

15. The standby generator of claim 14, wherein the controller is configured to determine a starting speed of the internal combustion engine and to control the rotation speed of the rotor based on the determined starting speed.

16. A standby generator comprising:
a standby housing defining a cavity;
an internal combustion engine comprising:
an engine block including a cylinder comprising a piston;
an engine housing at least partially covering the engine block;
a crankshaft configured to rotate about a vertical crankshaft axis in response to movement by the piston; and
a spark plug configured to periodically generate a spark to ignite fuel in the cylinder to control the movement of the piston;
an alternator comprising a rotor and a stator, the rotor configured to rotate with the rotation of the crankshaft to generate alternating current electrical power;
a battery configured to supply power to the alternator; and
a controller including a rectifier configured to convert the alternating current to a direct current and an inverter configured to convert the direct current to a clean alternating current electrical power;
wherein the rotor is further configured to rotate the crankshaft using power from the battery to start the internal combustion engine,
wherein the controller is configured to adjust spark generation timing of the spark plug based on the determined starting speed, and
wherein the internal combustion engine, the alternator, and the controller are positioned within the cavity of the standby housing for protection from the external environment.

* * * * *